(12) United States Patent
Kawamura et al.

(10) Patent No.: US 10,431,992 B2
(45) Date of Patent: Oct. 1, 2019

(54) BATTERY CHARGER WITH USER INTERFACE

(71) Applicant: TRAXXAS LP, McKinney, TX (US)

(72) Inventors: Tom Kawamura, Plano, TX (US); Kent Poteet, Lucas, TX (US)

(73) Assignee: TRAXXAS LP, McKinney, TX (US)

( * ) Notice: Subject to any disclaimer, the term of this patent is extended or adjusted under 35 U.S.C. 154(b) by 0 days.

(21) Appl. No.: 14/690,360

(22) Filed: Apr. 17, 2015

(65) Prior Publication Data

US 2016/0099581 A1 Apr. 7, 2016

Related U.S. Application Data

(63) Continuation-in-part of application No. 14/504,398, filed on Oct. 1, 2014.

(51) Int. Cl.
*H02J 7/00* (2006.01)

(52) U.S. Cl.
CPC .......... *H02J 7/0003* (2013.01); *H02J 7/0004* (2013.01); *H02J 7/0013* (2013.01); *H02J 7/0047* (2013.01); *H02J 7/0052* (2013.01)

(58) Field of Classification Search
USPC ......................................................... 320/106
See application file for complete search history.

(56) References Cited

U.S. PATENT DOCUMENTS

| D179,946 S | 3/1957 | Kerr |
| 3,794,957 A | 2/1974 | Winkler |
| 4,193,655 A | 3/1980 | Herrmann, Jr. |
| 5,049,804 A | 9/1991 | Hutchings |
| 5,111,128 A | 5/1992 | Branan, Jr. et al. |
| 5,130,634 A * | 7/1992 | Kasai ...................... H02J 7/008 320/160 |
| 5,283,512 A | 2/1994 | Stadnick et al. |
| 5,370,556 A | 12/1994 | Olsson |
| 5,371,453 A | 12/1994 | Fernandez |

(Continued)

FOREIGN PATENT DOCUMENTS

| CN | 201210314 Y | 3/2009 |
| DE | 202004012366 U1 | 10/2004 |

(Continued)

OTHER PUBLICATIONS

PCT/US15/53466; International Search Report and Written Opinion; dated Dec. 3, 2015.

(Continued)

*Primary Examiner* — Samuel Berhanu
(74) *Attorney, Agent, or Firm* — Daryl R. Wright; Greg Carr

(57) ABSTRACT

A battery charger may accommodate simultaneous charging of one or more batteries. The battery charger may also accommodate high power charging of a single battery. Li-type and/or Ni-type Batteries equipped with RFID technology may communicate with the battery charger equipped with similar technology to provide default charge settings in response to battery chemistry type, cell count, recommended charge rates, number of charges on the battery, among other information. The charge parameters may be user-adjustable in an 'advanced mode' of the battery charger. Several safety features may be included.

20 Claims, 19 Drawing Sheets

(56) References Cited

U.S. PATENT DOCUMENTS

| | | | |
|---|---|---|---|
| 5,575,674 A | 11/1996 | Davis et al. | |
| 5,744,937 A * | 4/1998 | Cheon | H02J 7/0006 320/106 |
| 5,816,842 A | 10/1998 | Thantrakul et al. | |
| 5,822,427 A | 10/1998 | Braitberg et al. | |
| 5,844,400 A | 12/1998 | Ramsier et al. | |
| 5,865,651 A | 2/1999 | Dague et al. | |
| 5,867,006 A | 2/1999 | Dias et al. | |
| 5,949,216 A * | 9/1999 | Miller | H02J 7/0052 320/125 |
| 6,007,362 A | 12/1999 | Davis et al. | |
| 6,014,008 A | 1/2000 | Hartzell et al. | |
| 6,022,246 A | 2/2000 | Ko | |
| 6,152,597 A | 11/2000 | Potega | |
| 6,184,655 B1 * | 2/2001 | Malackowski | H02J 7/0026 320/116 |
| 6,232,750 B1 | 5/2001 | Podrazhansky et al. | |
| 6,236,186 B1 | 5/2001 | Henton et al. | |
| 6,634,896 B1 | 10/2003 | Potega | |
| 6,746,284 B1 | 6/2004 | Spink, Jr. | |
| D494,933 S | 8/2004 | Lu | |
| 7,059,769 B1 | 6/2006 | Potega | |
| 7,104,831 B2 | 9/2006 | Fukatsu et al. | |
| D552,560 S | 10/2007 | Victor | |
| 7,374,460 B1 | 5/2008 | Hariharesan et al. | |
| D573,536 S | 7/2008 | Hariharesan et al. | |
| D576,557 S | 9/2008 | Hariharesan et al. | |
| D577,671 S | 9/2008 | Schnitzler | |
| D589,881 S | 4/2009 | Kok et al. | |
| 7,615,963 B2 | 11/2009 | Tashiro et al. | |
| 7,696,718 B2 | 4/2010 | Suzuki | |
| 7,736,197 B2 | 6/2010 | Takeda | |
| 7,888,913 B1 | 2/2011 | Marty et al. | |
| 8,029,310 B2 | 10/2011 | Shindo et al. | |
| 8,123,571 B2 | 2/2012 | Brown et al. | |
| D659,640 S | 5/2012 | Tseng | |
| D662,889 S | 7/2012 | Smith | |
| D665,748 S | 8/2012 | Baker et al. | |
| 8,974,244 B2 | 3/2015 | Aihara | |
| 8,998,656 B2 | 4/2015 | Amano et al. | |
| D743,338 S | 11/2015 | Christensen et al. | |
| D743,339 S | 11/2015 | Christensen et al. | |
| 10,027,146 B2 | 7/2018 | Christensen et al. | |
| 10,075,001 B2 | 9/2018 | Christensen | |
| 2002/0070702 A1 | 6/2002 | Ragnarsson | |
| 2002/0072275 A1 | 6/2002 | Arai | |
| 2003/0160592 A1 | 8/2003 | Murakami et al. | |
| 2004/0066174 A1 * | 4/2004 | Choi | H02J 7/0054 320/149 |
| 2005/0174094 A1 | 8/2005 | Purdy et al. | |
| 2006/0145661 A1 | 7/2006 | Patino et al. | |
| 2006/0194102 A1 | 8/2006 | Keshishian et al. | |
| 2007/0069688 A1 | 3/2007 | Satsuma | |
| 2007/0080660 A1 | 4/2007 | Fagan et al. | |
| 2007/0182367 A1 | 8/2007 | Partovi | |
| 2008/0007218 A1 | 1/2008 | Veselic | |
| 2008/0048614 A1 * | 2/2008 | Partin | H02J 7/0073 320/116 |
| 2008/0261460 A1 | 10/2008 | Hariharesan et al. | |
| 2008/0297104 A1 | 12/2008 | Rao et al. | |
| 2009/0096421 A1 | 4/2009 | Seman, Jr. | |
| 2009/0289599 A1 | 11/2009 | White et al. | |
| 2010/0171460 A1 | 7/2010 | Nakajima et al. | |
| 2010/0295503 A1 | 11/2010 | Bourilkov et al. | |
| 2011/0003512 A1 | 1/2011 | Bower et al. | |
| 2011/0248680 A1 | 10/2011 | Timmons et al. | |
| 2011/0294361 A1 | 12/2011 | Schrader | |
| 2012/0109402 A1 | 5/2012 | Shelton et al. | |
| 2012/0249083 A1 | 10/2012 | Garrastacho et al. | |
| 2012/0319658 A1 | 12/2012 | White et al. | |
| 2013/0057198 A1 | 3/2013 | Gerlovin | |
| 2013/0260182 A1 | 10/2013 | Knitt et al. | |
| 2014/0239881 A1 | 8/2014 | Cassidy | |
| 2014/0245036 A1 | 8/2014 | Oishi | |
| 2014/0335739 A1 | 11/2014 | Sato et al. | |
| 2015/0048780 A1 | 2/2015 | Listl et al. | |
| 2015/0126075 A1 | 5/2015 | Chen et al. | |
| 2015/0180175 A1 | 6/2015 | Yu et al. | |
| 2015/0249360 A1 | 9/2015 | Ichikawa | |
| 2015/0255890 A1 | 9/2015 | Xu et al. | |
| 2016/0087314 A1 | 3/2016 | Arashima et al. | |

FOREIGN PATENT DOCUMENTS

| | | |
|---|---|---|
| DE | 202012000291 U1 | 4/2012 |
| DE | 202012103996 U1 | 1/2013 |
| DE | 202013004312 U1 | 10/2013 |
| EP | 0780915 A1 | 6/1997 |
| EP | 1 128 517 A3 | 12/2003 |
| EP | 2416407 A1 | 2/2012 |
| JP | 2005-237155 A | 9/2005 |
| JP | 2011 324426 A | 12/2011 |
| JP | 2013-021780 A | 3/2013 |
| WO | 99/38238 A1 | 7/1999 |
| WO | 2007/015605 A1 | 2/2007 |
| WO | 2010028368 A1 | 3/2010 |
| WO | WO 2010/028368 A1 | 3/2010 |
| WO | 2013104431 A1 | 7/2013 |
| WO | WO 2013/104431 A1 | 7/2013 |

OTHER PUBLICATIONS

PCT/US15/53478; International Search Report and Written Opinion; dated Nov. 23, 2015.

PCT/US2015/053466; International Search Report and Written Opinion; dated Dec. 3, 2015.

PCT/US2015/053478; International Search Report and Written Opinion; dated Nov. 23, 2015.

PCT/US2015/034083; International Search Report & Written Opinion; dated Sep. 10, 2015.

Molex; Imperium HVHC Connector System data sheet_www.molex.com_171466-9001; May 13, 2014.

Molex; Imperium HVHC Connector System engr dwg_MDATA_DS-171466-9000; May 13, 2014.

Molex; Imperium HVHC Connector System application specification_J. Quiles_AS-171467-001; May 13, 2014.

Molex; Imprerium HVHC Connector System product specification_J. Quiles_PS-171467-001; May 13, 2014.

Rclogger; RFID Balancing Charger, Description_http://www.rclogger.com/Innovations/RFID-Balancing-Charger-Dual-300W/RFID-Balancing-Charger-Dual-300W.html; May 20, 2014.

Rclogger; RFID Balancing Charger, Features_http://www.rclogger.com/Innovations/RFID-Balancing-Charger-Dual-300W/RFID-Balancing-Charger-Dual-300W.html; May 20, 2014.

Rclogger; RFID Balancing Charger, Gallery_http://www.rclogger.com/Innovations/RFID-Balancing-Charger-Dual-300W/RFID-Balancing-Charger-Dual-300W.html; May 20, 2014.

Rclogger; RFID Balancing Charger, Specs_http://www.rclogger.com/Innovations/RFID-Balancing-Charger-Dual-300W/RFID-Balancing-Charger-Dual-300W.html; May 20, 2014.

Tjintech; "All about lipo balance connectors"_http://www.tjinguytech.com/charging-how-tos/balance-connectors; Jun. 2, 2014.

Mark Harrison; "Wiring multi-cell batteries"; http://eastbay-rc.blogspot.com/2010/12/wiring-multi-cell-batteries.html; Dec. 29, 2012.

Robbe; "BID System"; www.krikke.net; 2014-5-20.pdf.

Robbe Modell Sport; "BID System"; youtube.com-watch_v=lIV8ieSNTBU; Mar. 5, 2012.

SBS Implementers Formum; "Smart Battery Data Specification"; smartbattery.org; Dec. 11, 1998.

SBS Implementers Formum; "Smart Battery Charger Specification"; smartbattery.org; Dec. 11, 1998.

SBS Implementers Formum; "Smart Battery System Manager Specification"; smartbattery.org; Dec. 15, 1998.

Mikado_"Vstabi Pionerr of Flybarless—Batt ID Battery Detection"; www.vstabi.info_node1740; Oct. 15, 2014.

Mikado; "Vstabi Pionerr of Flybarless—Battery ID for VBar Control"; www.vstabi.info_node1753; Nov. 29, 2014.

(56) References Cited

OTHER PUBLICATIONS

Mikado; "Battery ID Reader for VBar Control-Technical Data" v1.01; www.mikado-heli.de_VBarControAkkuIDLeser; 2014-11.pdf.
Jon Lampert; "iMax X200" Sample pictures by author; May 15, 2015.
Hobby King; iMax "X200 Instruction"; www.hobbyking.com_914261155X365809X45; May 15, 2015.
Jon Lampert; "Yunec Q500" Sample pictures by author; Mar. 13, 2015.
Amphenol; "Cool Power"; amphenolcanada.com; May 15, 2015.
Amphenol_"Data Center—Cool Power Slim Drawer"; http://www.amphenol-datacenter.com/PS-CoolPowerSlimDrawer.htm; May 15, 2015.
JST; "LBT—A Type Series"; May 15, 2015.
JST; "RIJ Connector" data sheet; May 15, 2015.
JST; "RWZ Connector" data sheet; May 15, 2015.
Panasonic; "B01 Stacking Connector for High Current" data sheet; May 15, 2015.
Positronic; "Scorpion Series Modular Power, Signal Connectors" catalog; May 15, 2015.
Dura Trax Onyx 100, AC/DC Peak Charger, Instruction Manual; 2009.
Dura Trax Onyx 150, AD/DC Lipo Charger, Instruction Manual; 2012.
Dura Trax Onyx 200, AC/DC Sport Peak Charger; Instruction Manual; 2008.
Dynamite Prophet Sport II AC/DC Charger, Operation Manual; 2010.
Dynamite Prophet Plus II, AC/DC Powered Peak Detection Fast Charger; Manual; revised Dec. 2009.
Dynamite Prophet Sport Lipo; Instruction Manual; 2011.
Radient Ascend Multi-Chemistry AC/DC Peak Detection Balance Charger; Owner's Manual; 2011.
Radient Primal Multi-Chemistry AC Balance Charger; Owner's Manual; 2011.
Reedy 526-S Balance Charger; no date available.
Traxxas EZ-Peaks 5 AMP Fast Charger Instructions; 2013.

\* cited by examiner

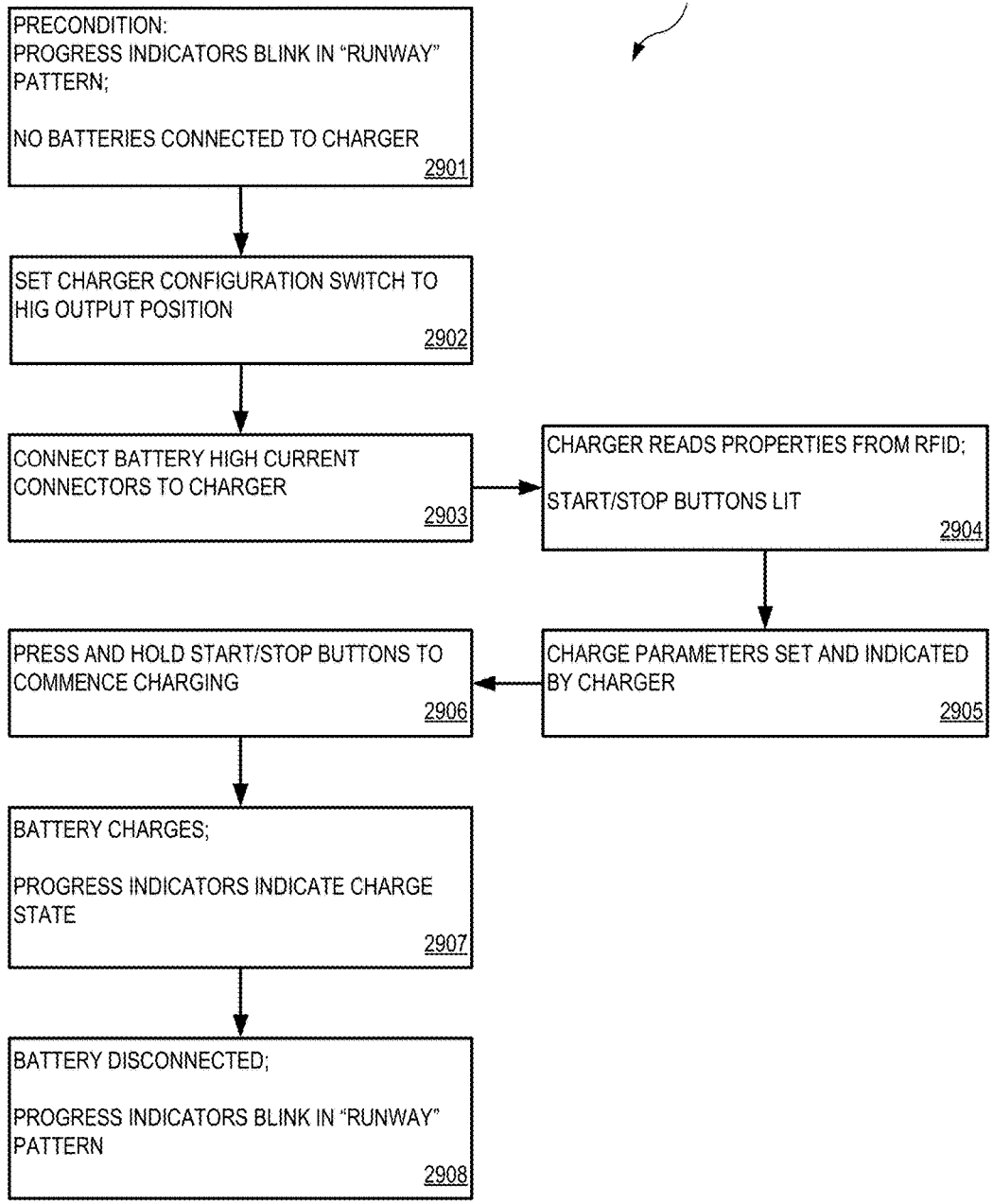

BATTERY CHARGER WITH USER INTERFACE

CROSS-REFERENCE TO RELATED APPLICATIONS

This application is a continuation-in-part of, and claims the benefit of the filing date of, co-pending U.S. patent application Ser. No. 14/504,398 entitled "BATTERY CHARGER WITH USER INTERFACE," filed Oct. 1, 2014, which relates to and claims the benefit of the filing date of U.S. Provisional Patent Application, Ser. No. 62/007,403 filed on Jun. 3, 2014, entitled "INTELLIGENT BATTERY-POWERED SYSTEM CONNECTOR," the entire contents of which are incorporated herein by reference for all purposes.

BACKGROUND OF THE INVENTION

Field of the Invention

The present invention relates to battery chargers, and, more particularly, to battery chargers configurable to accommodate charging of one or more batteries of one or more chemistry types in response to received input from one or more sources.

Description of the Related Art

Radio Controlled (RC) model vehicles appeal to people of all ages and skill sets. Many people who own RC vehicles do not understand all of the technical details about their vehicles or equipment, but only want to drive their vehicles and have fun. Using batteries that are not compatible with a particular battery charger may have catastrophic consequences for the battery, model vehicle, or charger. During daily use of RC model vehicles, multiple battery types and chemistry types may be used. Battery voltages can vary widely from less than 4.0V to greater than 25V. Many different battery chemistries are available; for example NiCd (Nickel Cadmium), NiMH (Nickel Metal Hydride), LiPO (Lithium Polymer) and Pb (Lead Acid). Each time a different type of battery is used, settings need to be modified on the battery charger (charge termination voltage, for example) to ensure the battery is not damaged. As customers and other users in the RC community use different types of batteries, it has become evident that most users are not properly educated on the differences and requirements of each different type; especially as it relates to the battery chemistry. A mismatch of settings on the battery charger may cause serious damage to property, particularly to the battery being charged. There is a need to reduce the danger of using a battery with an improperly paired device and reduce the amount of time it takes to modify the battery charger settings that will not only improve user ability, but also add multiple layers of protection.

SUMMARY

The invention comprises one or more systems, methods, and apparatus for applying an appropriate and/or desired charge to one or more batteries.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

Figure 1:
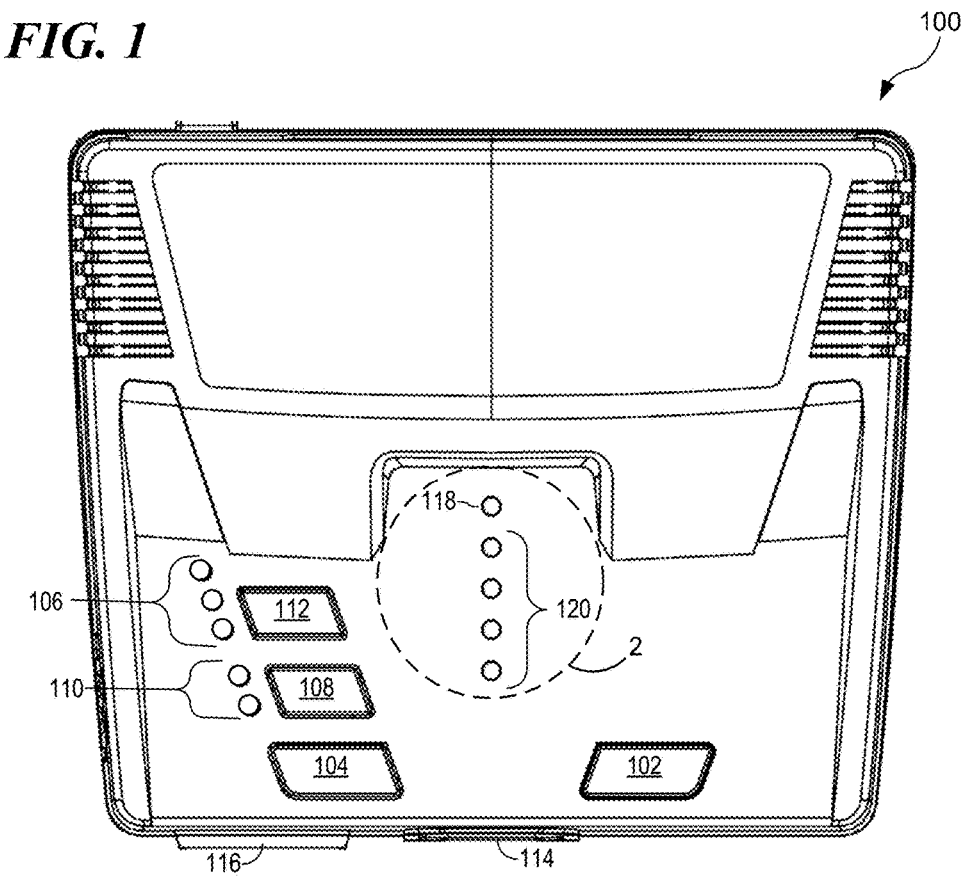
FIG. 1 is a top-down view of an embodiment of a first battery charger 100.

In the following discussion, numerous specific details are set forth to provide a thorough understanding of the present invention. However, the present invention may be practiced without such specific details. In other instances, well-known elements have been illustrated in schematic or block diagram form in order not to obscure the present invention in unnecessary detail. Additionally, and for the most part, details concerning well-known features and elements have been omitted inasmuch as such details are not considered necessary to obtain a complete understanding of the present invention. Specifically, details concerning electronic communications, electro-magnetic signaling techniques, RFID, battery charge current generation and control, methods of battery charging, and the like, have been omitted.

The First Battery Charger 100

A single battery charger may accommodate rechargeable batteries of different chemistries, such as accommodating both Li-type and Ni-type batteries, for example. The battery charger may be configured to implement charge parameter settings received from a coupled battery to be charged. The battery charger may also be configured to implement default charge parameter settings in response to detected conditions. The battery charger may also be configured to receive user input for adjusting and/or entering charge parameter settings.

Lithium Polymer (LiPo) batteries equipped with RFID technology and integrated balance taps may communicate with a device such as a battery charger equipped with similar technology providing information such as chemistry type, cell count, recommended charge rates, number of charges on the battery, among other types of information. Safety features may include:

the ability for the RFID tag to program a charger once the tag is read, allowing for single push-button charging; an integrated balance tap may reduce the need for multi-process charging setups;

the balance taps may be used in conjunction with the RFID tag information to add additional layers of battery cell type confirmation;

a short antenna range on the RFID reader may reduce interference from surrounding items;

the RFID reader may read and register one tag to reduce errors in information transfer; and the system may be designed to read RFID tag information before an electrical connection is made. For example, reading the RFID tag information may be pre-requisite to charging an RFID. In an embodiment, the RFID reader may see the RFID tag before the positive and negative terminals of the connector make contact with a paired device, such as a battery charger, for example.

In an embodiment, a battery charger 100 according to the present invention may comprise a charger output port for coupling with a battery to be charged, a sensor device and reader for receiving information from the battery to be charged, one or more balance ports for balance charging, a plurality of switches for receiving user input, a plurality of status indicators, and a plug for connecting the battery charger to a power supply. In alternative embodiments the battery charger may be provided with additional, fewer, or different components.

The first battery charger 100 may be configured to be compatible with rechargeable batteries of several types. For example, the battery charger may be configured to be capable of charging both NiMH type and LiPo type batteries. The first battery charger 100 may further be configured to be capable of charging different sized batteries of each type. For example, in a specific embodiment, the first battery charger 100 may be configured to be compatible with NiMH batteries of either 2/3A or Sub-C sizes, as well as LiPo battery packs of 2S and 3S sizes.

The listed examples are intended to be illustrative only. In alternative embodiments, the first battery charger 100 may be configured to be capable of charging batteries of different types and sizes than those listed above. Specifics regarding each battery type and size are omitted from this description as such details are not considered necessary to obtain a complete understanding of the present invention, and are considered to be within the understanding of persons of ordinary skill in the relevant art.

Figure 4:
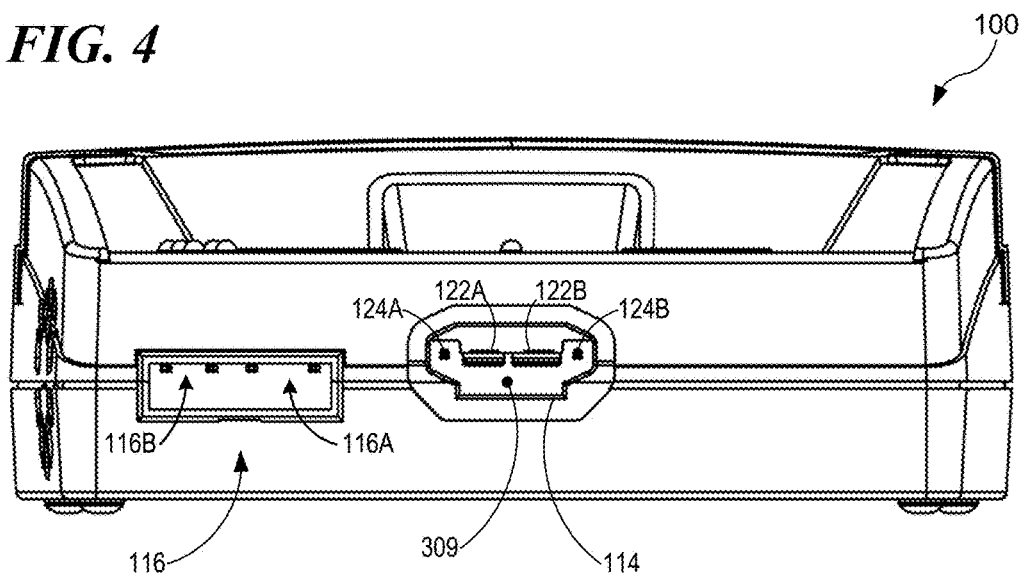
FIG. 4 is a front view of an embodiment of the first battery charger 100.

As shown in FIGS. 1 and 4, in an embodiment, a battery charger 100 may comprise a charger output port 114 for electrically coupling a rechargeable battery to the first battery charger 100. In an embodiment, the charger output port 114 may be an electrical connector such as an electrical socket or receptacle for receiving an electrical plug coupled to a battery to be charged, for example. According to the embodiment shown, the charger output port 114 may comprise an electrical socket comprising an insulating material and implemented with two male terminals 122A and 122B for receiving a female electrical connector 152 of a rechargeable battery 150. In an embodiment, the charger output port 114 may be provided with balancing terminals 124A and 124B, which may electrically couple with a LiPo balancing circuit 312, shown in FIG. 9. The first battery charger 100 may be configured to provide a charging current to a rechargeable battery through the charger output port 114 upon user initiation of charging operation while the rechargeable battery is electrically connected to the charger output port 114.

In an embodiment, the first battery charger 100 may be configured to be compatible with only batteries of one or more specific types. The socket shape of the output charge port 114 may be implemented with one or more keying features for preventing incompatible batteries from electrically coupling with the first battery charger 100. Specific keying features that may be provided are discussed further in U.S. Provisional Patent Application, Ser. No. 62/007,403 filed on Jun. 3, 2014, titled "Intelligent Battery-Powered System Connector" the entire contents of which are incorporated herein by reference for all purposes.

Female electrical connector housings, having various keying and coupling features, are now described. A battery to be charged may be implemented with a female connector implemented with a female connector comprising a housing 1802, 1902, or 2002, and implemented with one or more of the features described below. The charger output port 114 may be configured to be compatible with female connector housings of the types described below. The first battery charger 100 may be configured with a charger output port 114 which may be a socket implemented with one or more features corresponding to features of the female connector housings described. Specifically, the charger output port 114 may be implemented with complimentary keying features, balance tab, or terminal, features, and an RFID communication device, or devices, to those of the female connector housings 1802, 1902, and 2002. The first battery charger 100 may, therefore, be configured to receive and charge a battery having female connector housings implemented with none, some, or all of the keying features and balance terminals described below in reference to housings 1802, 1902, and 2002.

Figure 18:
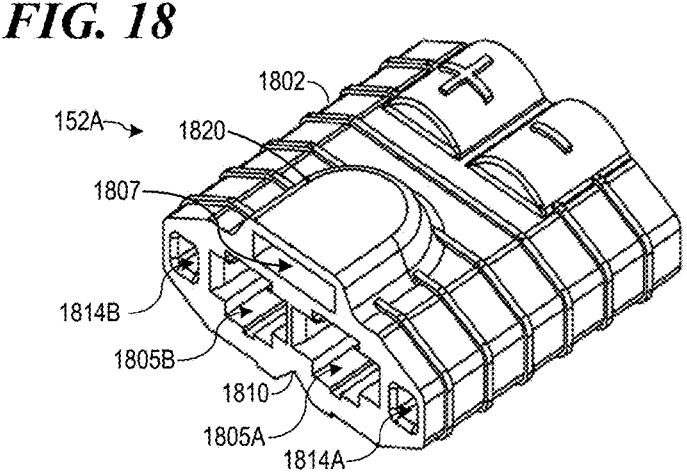
FIG. 18-20 are perspective views of female electrical connectors having certain keying features.

Turning now to FIG. 18, a female electrical connector 152C may include a housing 1802. The housing may have an elevated structure 1820 on a top side of the connector 152A and adjacent one end of the connector housing 1802. The elevated structure 1820 may partially enclose a cavity 1807 for receiving an RFID tag 206, as shown in FIG. 18. Adjacent the same end of the housing 1802 as the cavity 1807 there may be provided first and second main receptacles 1805A and 1805B, respectively. Adjacent the same end of the housing 1802 there may also be provided first and second channels 1814A and 1814B, respectively, for receiving balancing terminals 124A and 124B, as shown in FIG. 4. A keying feature 1810 may be provided in the housing 1802, and may comprise a V-shaped groove running along the center of a bottom side of the connector 1800, for example.

Figure 19:
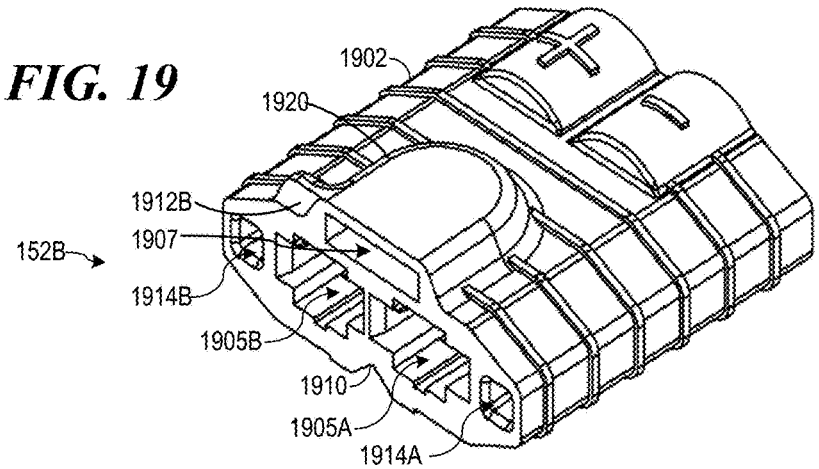

Turning now to FIG. 19, a female electrical connector 152B has a housing 1902 as described hereinbefore. The housing may have an elevated structure 1920 on a top side of the connector 152B and adjacent one end of the connector housing 1902. The elevated structure 1920 may partially enclose a cavity 1907 for receiving an RFID tag 206, as shown in FIG. 19. Adjacent the same end of the housing 1902 as the cavity 207 there may be provided first and second main receptacles 1905A and 1905B, respectively. Adjacent the same end of the housing 1902 there may also be provided first and second channels 1914A and 1914B, respectively, for receiving balancing terminals 124A and 124B, as shown in FIG. 4. A first keying feature 1910 may be provided in the housing 1902, and may comprise a V-shaped groove running along the center of a bottom side of the connector 152B, for example. A second keying feature 1912B may be provided, for example, on a top side of the connector 152B, and may be a protrusion extending from one side of elevated structure 1920 in the direction of receptacle 1905B and channel 1914B.

Figure 20:
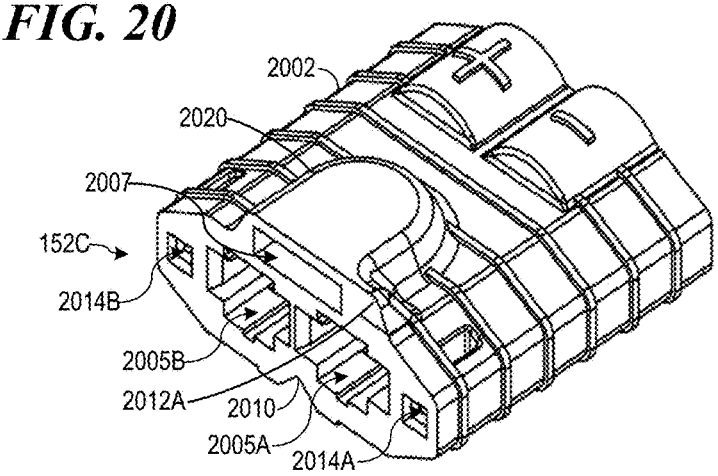

Turning now to FIG. 20, a female electrical connector 152C has a housing 2002 as described hereinbefore. The housing may have an elevated structure 2020 on a top side of the connector 152C and adjacent one end of the connector housing 2002. The elevated structure 2020 may partially enclose a cavity 2007 for receiving an RFID tag 206. Adjacent the same end of the housing 2002 as the cavity 207 there may be provided first and second main receptacles 2005 and 2005B, respectively. Adjacent the same end of the housing 2002 there may also be provided first and second channels 2014A and 2014B, respectively, for receiving balancing terminals 124A and 124B, as shown in FIG. 4. A first keying feature 2010 may be provided in the housing 2002, and may comprise a V-shaped groove running along the center of a bottom side of the connector 200A. A second keying feature 2012A may be provided, for example, on a top side of the connector 152C, and may be a protrusion extending from one side of elevated structure 2020 in the direction of receptacle 2005A and channel 2014A.

The charger output port 114 may be implemented with a sensor device 309, which may be coupled to an RFID reader 308, and which may be disposed along an inner surface of the electrical socket of charger output port 114. In an embodiment, the sensor device 309 may be an antenna coupled to the RFID reader 308 for receiving and transmitting data to the RFID reader 308. In some embodiments, the sensor device 309 and the RFID reader 308 may comprise a single component.

The output charge port 114 may comprise a socket composed of an insulating material. The insulating material of the socket may extend over an exposed length of the male terminals 122A and 122B. In such an embodiment, an RFID reader 308 and/or sensing device 309 may be disposed within the portion of the inner surface of the socket extending along the exposed length of the male terminals. Specific details regarding the location of the RFID reader 308 and sensing device 309 within the socket of the charge output port 114 may be found in U.S. Provisional Patent Application, Ser. No. 62/007,403 filed on Jun. 3, 2014, titled "Intelligent Battery-Powered System Connector" the entire contents of which are incorporated herein by reference for all purposes.

Figure 21:
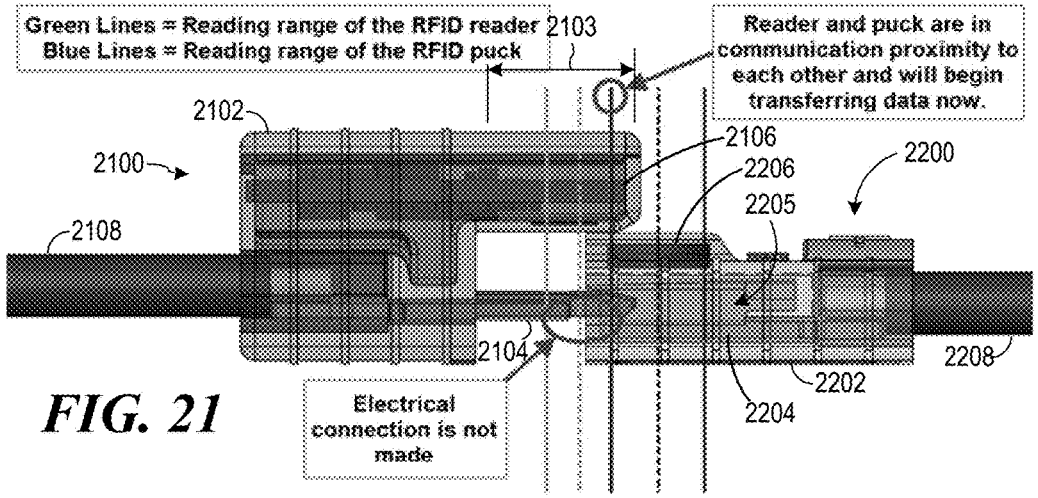
FIG. 21-23 are side, phantom views of male and female electrical connectors illustrating three stages of mating.
Figure 22:
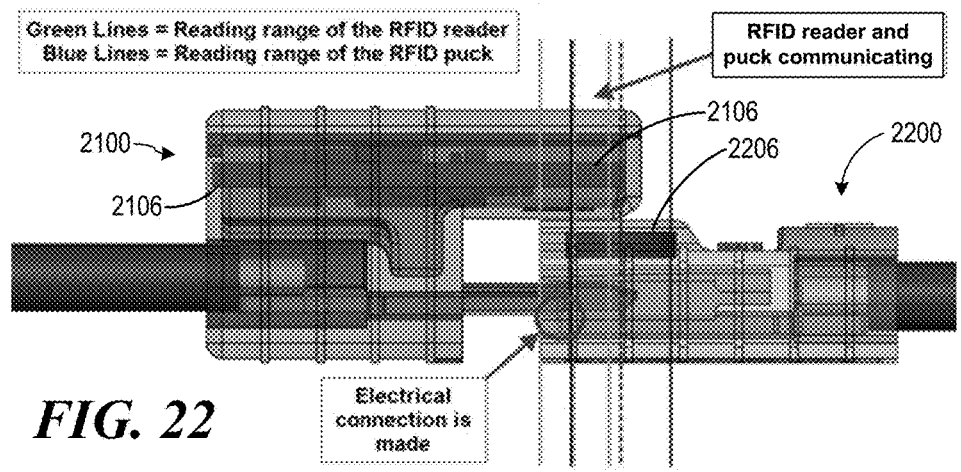
Figure 23:
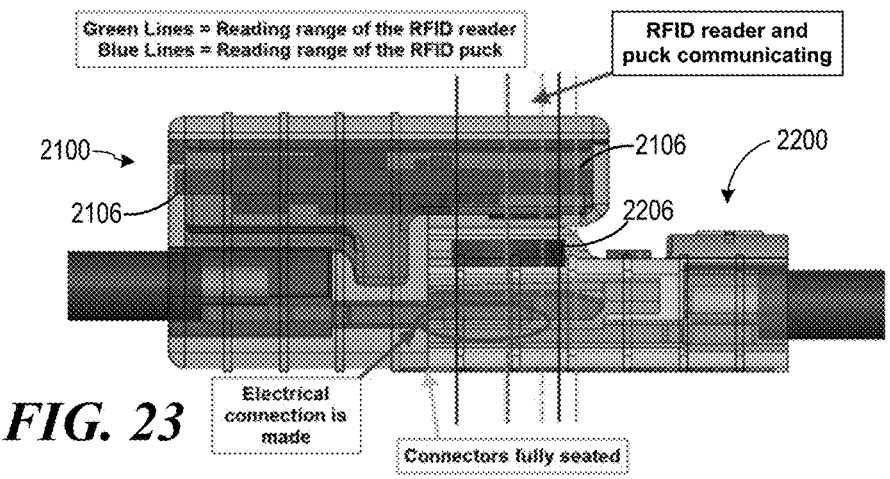

Turning now to FIGS. 21-23, a male electrical connector 2100 is shown in a phantom view engaging with a female electrical connector 2200, also shown in phantom view. An RFID equipped battery may comprise the female electrical connector 2200. An RFID equipped first battery charger 100 may comprise the male electrical connector 2100. The male electrical connector 2100 may comprise an insulated housing 2102 containing at least one male electrical terminal 2104 extending from a portion of the housing 2102. In an embodiment, there may be two male electrical terminals 2104 for connecting to positive and negative electrical circuits, respectively. The housing 2102 may extend over an exposed length of the male electrical terminals 2104, the extended portion 2103 for enclosing an RFID reader 308 and/or sensing device 309. It is well understood that the RFID reader 308 may be electrically connected to a smart device by suitable wiring (not shown). The male electrical terminals 2104 may be coupled to high-current capacity wiring 2108, such as 12AWG wires, for example.

The female electrical connector 2200 may comprise an insulated housing 2202 containing at least one female electrical terminal 2204 partially enclosed within a receptacle portion 2205 of the housing 2202. In an embodiment, there may be two female electrical terminals 2204 each at least partially enclosed within its own, separate receptacle portion 2205, for connecting to positive and negative electrical circuits, respectively. The housing 2202 may enclose an RFID tag 206. The female electrical terminals 2204 may be coupled to high-current capacity wiring 2208, such as 12AWG wires, for example.

When an RFID equipped battery is coupled to an RFID equipped charger, the RFID tag 206 and RFID reader 308 may establish an RF connection and start to communicate and transmit information, as illustrated in FIG. 21. As the electrical connectors 2100 and 2200 are pushed closer together, an electrical connection is made after the RFID tag 206 and RFID reader 308 have established an RF connection. Alternatively, the RFID reader 308 may not attempt to establish communications with the RFID tag 206 until electrical connection is made. Either way, the RFID tag 206 can be expected to be within range of the RFID reader 308 and/or sensing device 309, when an electrical connection is made. At this point, the first battery charger 100 may be enabled for charging operation.

The connector may be configured such that the RFID tag 206 may establish an RF connection with RFID reader 308 before an electrical connection is made to prevent improper usage of an RFID equipped battery, as illustrated in FIG. 22. If the connectors 2100 and 2200 are fully coupled, the RFID connection is still maintained. In an embodiment, there is no point where the RFID system does not maintain an RF connection while an electrical connection is made between the battery and the paired device, as illustrated in FIG. 23. In an embodiment, the RFID reader 308 may read the RFID tag 206 when the male and female connectors 2100 and 2200, respectively, are being coupled and the RFID tag 206 is enclosed within housing 2202, and may continue to read while the male and female connectors 2100 and 2200, respectively, are coupled. In another embodiment, the RFID reader 308 may be configured to read the RFID tag 206 located in other positions relative to the female connector 2200, such as being mounted on an exterior surface of the connector, for example, or any other suitable location.

In an embodiment, the first battery charger 100 may be configured to electrically couple with batteries comprising a female electrical connector that may comprise an insulated housing and two female terminals. The first battery charger 100 may be further configured to electrically couple with batteries having a female connector further comprising an RFID tag 206. In such an embodiment, the battery charger may be configured to also be compatible with batteries having a female connector not comprising an RFID tag 206.

In such an embodiment, the battery charger may be configured to respond in a different manner when electrically connected to a battery implemented with an RFID tag 206 than the manner that the first battery charger 100 is configured to respond when electrically connected to a battery without an RFID tag 206, as described later in this specification.

The RFID reader 308 and/or sensing device 309 may be disposed within the socket of the output charge port 114 and female electrical connector, respectively, such that the RFID tag 206 may be within range of the RFID reader 308 and/or sensing device 309 during and while an electrical connection is made between the battery and the first battery charger 100. An RF connection may be established as the female electrical connector of a battery is inserted into the socket of the charge output port 114. The RF connection may be maintained during the time in which the female electrical connector of the battery is electrically connected to the first battery charger 100.

The RFID reader 308 may be configured to attempt to establish communications with the RFID tag 206 upon sensing the RFID tag 206 or, alternatively, only after an electrical connection is made between the battery and the first battery charger 100. In an embodiment, the first battery charger 100 may enable charging of an RFID equipped battery only after an RF connection is made, to prevent improper charging of the RFID equipped battery.

When an RFID equipped battery is coupled to the RFID equipped battery charger 100, the RFID tag 206 and RFID reader 308 and/or sensing device 309 may establish an RF connection and start to communicate and transmit information to an RFID reader. Information contained on the RFID tag 206 may comprise a manufacturer assigned identifier number, or code, unique to the specific battery model, or unique to the battery, itself. Additionally, in alternative embodiments, further information such as chemistry type, cell count, recommended charge rates, number of charges on the battery, among other information, may be contained on the RFID tag 206 and read by the RFID reader 308 and/or sensing device 309 of battery charger 100. The first battery charger 100 may use the information received to configure the charge current and charge operation of the first battery charger 100, allowing for single push-button charging of batteries having a recognized RFID tag 206.

Figure 5:
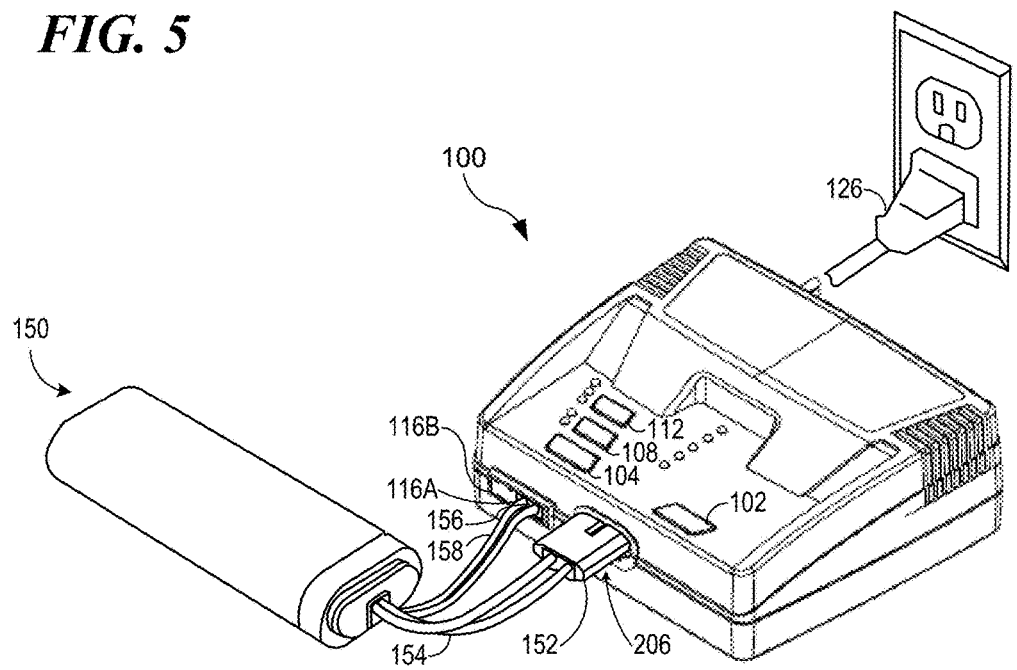
FIG. 5 is a perspective view of an embodiment of the first battery charger 100.

As shown in FIGS. 1, 4, and 5, the first battery charger 100 may be implemented with the balance connector ports 116A, B for electrically coupling with a balance connector of a battery to be charged. The balance connector ports 116A and 116B may electrically couple with one or more balancing circuits enclosed within the first battery charger 100 for use during balance charging of a Lithium-type battery, such as a LiPo battery, for example.

According to the particular embodiment shown, the first battery charger 100 may be implemented with the two balance connector ports 116A and 116B, which may be configured to have different sizes for accommodating batteries of different sizes. In the embodiment shown, the balance connector port 116A may be configured to accommodate a 2S LiPo battery, while the balance connector port 116B may be configured to accommodate a 3S LiPo battery. In alternative embodiments, the first battery charger 100 may be implemented with additional, or fewer, balance connector ports 116. Further, in an alternative embodiment, the first battery charger 100 may be implemented with balance connector ports of different sizes for accommodating larger LiPo batteries.

As shown in FIG. 5, in an embodiment, the first battery charger 100 may be configured to receive both a female electrical connector and a balance connector of the battery to be charged when balance charging a LiPo battery. In an embodiment, the first battery charger 100 may be configured to electrically couple to a 2S balance connector using the balance connector port 116A. In such an embodiment, the first battery charger 100 may be further configured to electrically couple to a 3S balance connector using the balance connector port 116B.

In some embodiments, the first battery charger 100 may be implemented with logic for adjusting one or more charger settings, such as the Battery Type, the Charge Mode, or the Charge Rate, each of which are described below, in response to a balance connector being electrically connected to one of the balance connector ports 116 of the first battery charger 100. For example, the first battery charger 100 implemented with a Battery Type selector may be configured to set the Battery Type to "LiPo" in response to a balance connector being electrically connected to one of the balance connector ports 116. Further, a battery charger 100 implemented with a Charge Type selector may be configured to set the Charge Type to "Balance" in response to a balance connector being electrically connected to one of the balance connector ports 116. The first battery charger 100 implemented with a Charge Rate selector may be configured to set the Charge Rate to a pre-determined value, such as "4A", for example, in response to a balance connector being electrically connected to one of the balance connector ports 116.

According to embodiment shown in FIG. 1, the first battery charger 100 may comprise four switches: a first switch 102; a second switch 104; a third switch 108; and, a fourth switch 112. Each switch may receive user input to set one or more charging parameters of the first battery charger 100. As shown in FIG. 1, each switch may comprise a push button. In alternative embodiments, the switches 102, 104, 108, 112 may comprise any combination of push buttons, toggle switches, radial switches, and the like. Further, in an alternative embodiment, the first battery charger 100 may be implemented with additional, or fewer, switches than shown in FIG. 1 or, alternatively, may be implemented with switches incorporated into a touch screen display.

As shown in FIG. 1, the first switch 102 of the first battery charger 100 may be a push button switch providing the user "start/stop" control over the delivery of a charging current by the first battery charger 100. The first switch 102 may be configured to initiate delivery of a charging current by the first battery charger 100 to a battery to be charged, starting charging of the battery, upon depression of the first switch 102 by the user. In addition, the first switch 102 may be configured to terminate delivery of a charging current to a battery to be charged, thereby stopping charging of the battery, upon a subsequent depression of the first switch 102 by the user. In this manner, the first switch 102 may be used by the user to toggle the first battery charger 100 between charging and non-charging operation. In an embodiment, the first switch 102 may be configured to toggle the first battery charger 100 between charging and non-charging operation in response to the first switch 102 being held in the depressed position for a specified amount of time, for example, two seconds.

The first switch 102 may also be configured to operate as a status indicator, illuminating to indicate a status or condition of the first battery charger 100. The first switch 102 may comprise a material configured to allow light to pass through it and be positioned over a light emitting diode (LED) housed within the first battery charger 100. Upon the occurrence of a specific status or condition of the first battery charger 100, the LED may be illuminated, causing the first switch 102 to illuminate and indicating to the user the occurrence of a status or condition of the first battery charger 100.

In an embodiment, for example, the first switch 102 may illuminate during times when the first battery charger 100 has received information from a battery to be charged through a sensor device of the first battery charger 100. In a particular embodiment, the battery to be charged may be comprise an RFID chip, for example, with the first switch 102 configured to illuminate in response to the first battery charger 100 receiving the information contained on the RFID chip of the battery to be charged. In such an embodiment, the first switch 102 may be further configured to not illuminate, or, alternatively, illuminate in a second mode, perhaps in a different color or flashing on and off, for example, when a battery is electrically connected to the battery charger and no information is received by the sensor from the battery to be charged.

As shown in FIG. 1, the first battery charger 100 may be implemented with a second switch 104 which may be a push button switch for allowing the user to select a "Charge Rate." The Charge Rate selected may set the amperage (A) of the charge current to be provided by the first battery charger 100 to a battery to be charged. As shown in the embodiment of FIG. 1, the first battery charger 100 may be configured with four "Charge Rate" options: 1A; 2A; 3A; or 4A. In an alternative embodiment, the first battery charger 100 may be implemented with additional, or fewer, Charge Rates with larger, or smaller, steps between adjacent selection amperage values. In a further alternative, the Charge Rate may be selected from a continuous range of amperage values.

The second switch 104 may be configured to cycle through the Charge Rate options, incrementally changing the selection with each press of the second switch 104 by the user. In an alternative embodiment, the second switch 104 may be a toggle switch, radial switch, or the like, with the user moving the second switch 104 to the position corresponding to a desired mode selection.

The first battery charger 100 may also be configured with default settings implemented in response to a battery of a specific battery chemistry being connected to the first battery charger 100. For example, the first battery charger 100 may be configured to default to the "4A" Charge Rate setting when the first battery charger 100 detects that a NiMH battery is connected to the first battery charger 100. In such an embodiment, the first battery charger 100 may be configured to detect the NiMH-type battery through information received from the connected battery through a sensor device of the first battery charger 100, or, alternatively, in response to user selection of the NiMH Battery Type using the third switch 108, as described above.

The first battery charger 100 may be implemented with logic for allowing the user to "unlock" the first battery charger 100, allowing the user to override or input charge parameter settings while a battery is coupled to the first battery charger 100. This may be regarded as using the first battery charger 100 in "Advanced Mode." The first battery charger 100 may be implemented with logic for entering "Advanced Mode" in response to a specific user action, such as pressing and holding both the "Start/Stop" and "Charge Rate" pushbuttons simultaneously for 2 seconds, for example. Further, the first battery charger 100 may be configured to indicate that "Advanced Mode" has been entered, such as by causing one or more indicators 120 to flash, for example. Specific instances when "Advanced Mode" may be used and the capabilities "unlocked" by entering "Advanced Mode" are described later in this description.

As shown in FIG. 1, the first battery charger 100 may be implemented with a third switch 108 which may be a push button switch for allowing the user to select a "Battery Type." The third switch 108 may be configured to cycle through the available types, incrementally changing the selection with each press of the third switch 108 by the user. In an alternative embodiment, the third switch 108 may be a toggle switch, radial switch, or the like, with the user moving the third switch 108 to the position corresponding to a desired type selection.

As shown in FIG. 1, the first battery charger 100 may be configured with two "Battery Type" options: Lithium-polymer ("LiPo") and Nickel-metal hydride ("NiMH"). In alternative embodiments, the first battery charger 100 may be implemented with additional, or fewer, Battery Types. For example, the battery charger may be configured to charge rechargeable batteries of other known chemistries comprising the prior art, such as Lithium-iron (LiFe), Lithium-ion, Nickle-cadmium (NiCd), and the like.

The first battery charger 100 may be configured with default settings implemented in response to a battery of a specific type being connected to the first battery charger 100. For example, the first battery charger 100 may be configured to default to the LiPo type in response to receipt of a balance port connector at a balance port of the first battery charger 100.

Figure 3:
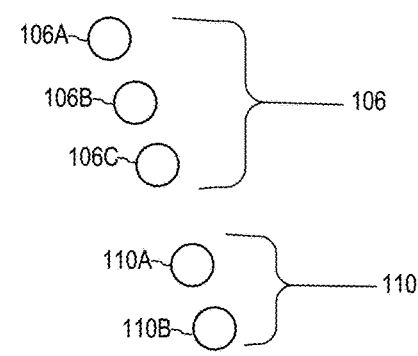
FIG. 3 is a detail view showing charging parameter selection indicators of an embodiment of the first battery charger 100.

As shown in FIGS. 1 and 3, the first battery charger 100 may be implemented with one or more Battery Type selection indicators 110A and 110B, which may be LEDs, for indicating the Battery Type selected. The first battery charger 100 may be configured to illuminate the LED corresponding to the currently selected Battery Type. In an alternative embodiment, additional, fewer, or no Battery Type selection indicators 110 may be provided. For example, in an embodiment utilizing a radial switch for Battery Type selection, no Battery Type selection indicators may be provided. In another embodiment, a single indicator 110 may be provided and configured to illuminate a different color corresponding to each of the possible Battery Types.

As shown in FIG. 1, the first battery charger 100 may be implemented with a fourth switch 112 which may be a push button switch for allowing the user to select a "Charge Mode." The fourth switch 112 may be configured to cycle through the available modes, incrementally changing the selection with each press of the fourth switch 112 by the user. In an alternative embodiment, the fourth switch 112 may be a toggle switch, radial switch, or the like, with the user moving the fourth switch 112 to the position corresponding to a desired mode selection.

As shown in FIG. 1, the first battery charger 100 may be configured with three "Charge Mode" options: Store, Fast, and Balance. Store mode may charge or discharge a battery connected to the first battery charger 100 to bring the battery to a storage voltage and may be used for preparing a battery for a period of nonuse. Fast mode may charge a battery to the peak voltage of the battery. Charging in fast mode may terminate upon the first cell of a multi-cell battery reaching the peak voltage. Balance charge may charge a multi-cell battery to a peak voltage while maintaining uniform charge among the multiple battery cells. For each of the above-described modes, charging or discharging may be accomplished through peak voltage detection, through constant-voltage and constant-current (CVCC) charging, or any other known methods of battery charging comprising the prior art. In an embodiment, the first battery charger 100 may be implemented with additional, or fewer, Charge Modes.

Further, in an embodiment, the first battery charger 100 may be configured to allow selection of one or more of the Charge Modes only when a battery of a specific chemistry is to be charged. For example, the first battery charger 100 may be configured to prevent selection of "balance" charge unless a Lithium polymer (LiPo) type battery is connected to the first battery charger 100. Further, the first battery charger 100 may be configured to enable the Charge Mode function when a battery of a specific type is to be charged. For example, the first battery charger 100 may utilize the Charge Mode selection function only when a LiPo type battery is to be charged, with the Charge Mode selection function not configured to be used when the NiMH Battery Type is selected. In an embodiment according to the last example, the "Charge Mode" button may be implemented with "LIPO" label to indicate the Charge Mode is only configurable at times when a LiPo type battery is connected to the first battery charger 100.

The first battery charger 100 may also be configured with default settings implemented in response to a battery of a specific battery chemistry being connected to the first battery charger 100. For example, the first battery charger 100 may be configured to default to the Balance Charge Mode when the first battery charger 100 detects that a LiPo battery is connected to the first battery charger 100. In such an embodiment, the first battery charger 100 may be configured to detect the LiPo-type battery through information received from the connected battery through a sensor device of the first battery charger 100, or, alternatively, in response to receipt of a balance port connector at a balance port of the first battery charger 100.

As shown in FIGS. 1 and 3, the first battery charger 100 may be implemented with one or more Charge Mode selection indicators 106A-C, which may be LEDs, for indicating the Charge Mode selected. The first battery charger 100 may be configured to illuminate the LED corresponding to the currently selected Charge Mode. In an alternative embodiment, additional, fewer, or no Charge Mode selection indicators 106 may be provided. For example, in an embodiment utilizing a radial switch for Charge Mode selection, no Charge Mode selection indicators may be provided. In another embodiment, a single indicator 106 may be provided and configured to illuminate a different color corresponding to each of the possible Charge Modes.

Figure 2:
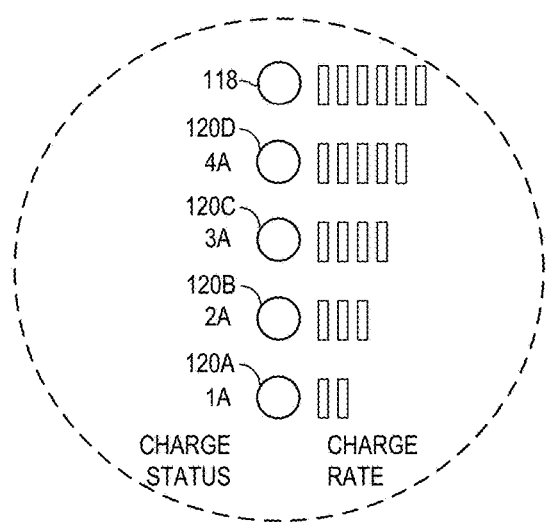
FIG. 2 is a detail view showing the status indicators of an embodiment of the first battery charger 100.

As shown in FIGS. 1 and 2, the first battery charger 100 may be implemented with one or more indicators 118 and 120. The indicators 118 and 120, which may be one or more LEDs, may be configured to indicate the Charge Status, the selected Charge Rate, and the Charge Progress. In alternative embodiments, the indicators 118 and 120 may be configured to indicate additional, fewer, or different statuses of the battery charger.

According to the embodiment shown, the first battery charger 100 may be implemented with a Charge Status indicator 118 comprising a single LED. In such an embodiment, the Charge Statues indicator may be configured to illuminate in one or more modes for indicating different statuses of the first battery charger 100. In an embodiment, the charge mode indicator may illuminate in a first mode during at least a portion of the charging mode and in a second mode when charging is completed, for example. In an embodiment, the mode indicator may illuminate in a third mode if no information is received by the sensor when the electrical connector is coupled to the battery to be charged, for example. In an alternative embodiment, more than one Charge Status indicator 118 may be provided, with the illumination pattern of the one or more indicators 118 indicating the first battery charger 100 status.

In an exemplary embodiment implemented with a single LED Charge Status indicator 118, the Charge Status indicator 118 may be configured to flash on and off during times when the first battery charger 100 is providing a charging current to a battery to be charged. In such an embodiment, the Charge Status indicator 118 may be further configured to remain illuminated upon completion of charging of a battery. In alternative embodiments, different modes of illumination may be provided to indicate one or more Charge Statuses to the user. For example, the color of light emitted by the Charge Status indicator 118 may vary to indicate different battery charger 100 statuses.

According to the embodiment shown in FIGS. 1 and 2, the first battery charger 100 may be implemented with a plurality of indicators 120, which may be LEDs, for indicating the Charge Rate and/or the Charge Progress. In an embodiment, the charging status indicators 120A-120D may be a plurality of light emitting devices illuminating in succession to indicate the amount of electrical charge delivered to a battery to be charged, for example. As noted above, the Charge Rate may be the amperage of the charging current provided by the first battery charger 100 to a battery. The Charge Progress may be an indication of the current charge level of the battery being charged. The Charge Progress may be displayed as a ratio, or percentage, of current charge to peak charge or, alternatively, may be displayed as symbols indicating a progressive increase in charge amount.

As shown, the first battery charger 100 may comprise four Charge Rate/Progress indicators 120A-D. Each Charge Rate/Progress indicator 120 may be implemented with one or more labels, as shown in FIG. 2, specifying a Charge Rate and/or Charge Progress value. For example, indicator 120A may be provided with a "1A" label for indicating a 1 amp Charge Rate as well as a symbol indicating a relative amount of charge contained by a battery being charged, the Charging Progress. In alternative embodiments, the first battery charger 100 may be implemented with more, or fewer indicators 120 configured to indicate additional, fewer, or different statuses or conditions of the first battery charger 100.

During times when the first battery charger 100 is connected to a battery but is not providing a charging current, the first battery charger 100 may be configured to indicate the selected Charge Rage by illuminating the Charge Rate/Progress indicator 120A-D corresponding to the selected Charge Rate. The first battery charger 100 may be further configured to illuminate the Charge Rate/Progress indicators 120 to indicate the currently selected Charge Rate only during times when the first battery charger 100 has received information from the battery through the sensor device and prior to commencement of providing a charging current to the battery. At such times the Charge Rate indicator 120A-D illuminated may change with each press of the fourth switch 112 by the user, cycling through the Charge Rate options as described above.

In some embodiments, the first battery charger 100 may be implemented with logic permitting the Charge Rate selected to be indicated to the user during charging of a battery. In such embodiments, the first battery charger 100 may be configured to illuminate only the Charge Rate/Progress indicator 120 corresponding to the currently selected Charge Rate in response to user input during charging, such as in response to the user pressing the "Charge Rate" button during charging, for example. The first battery charger 100 may be configured to display the current Charge Rate in the manner described above for a specified period of time, such as for five seconds, perhaps. In addition, the first battery charger 100 may be configured to illuminate the Charge Status indicator 118 in a solid mode during the time in which the Charge Rate selection may be indicated during charging of a battery.

The first battery charger 100 may be further configured to indicate the Charge Progress at times when the first battery charger 100 is providing a charging current to a battery through illumination of the Charge Rate/Progress indicator, or indicators, 120A-D corresponding to the amount of charge contained the battery being charged. For example, and according to the embodiment shown, during a complete charging of a battery having no charge initially, the Charge Rate/Progress indicators 120A-D may illuminate in succession with indicator 120A illuminating first, indicating the battery has little or no charge, perhaps with the battery charge being below 20% of the peak voltage charge. As the battery charge increases during charging, additional indicators 120 may illuminate. According to the present example, indicators 120A and 120B may both illuminate upon the battery charge reaching a threshold charge amount, perhaps 40% of peak voltage. Similarly, indicator 120C may illuminate upon the battery charge reaching 60% of peak voltage and 120D at 80%. At full charge, the first battery charger 100 may be configured to illuminate the Charge Status indicator 118 according to a specific mode, or pattern, as described above.

The Charge Status indicator 118 and Charge Rate/Progress indicators 120A-D may be further configured to illuminate in an alternative manner, such as sweeping back-and-forth or collectively flashing, for example, at times when the first battery charger 100 is connected to a battery and the sensor device 309 has not received any information from the battery. Additionally, the Charge Rate/Progress indicators 120A-D may be configured to illuminate in a specific mode at start up for indicating to a user that the first battery charger 100 is powered up and waiting to be coupled to a battery to be charged. For example, the first battery charger 100 may be configured to illuminate the Charge Rate/Progress indicators 120A-D in a "runway" pattern at start up, or, additionally, at any time that the battery charger is capable of charging and awaiting coupling to a battery to be charged, such as upon disconnection of a battery that has just been charged.

The first battery charger 100 may be implemented with logic for displaying error codes to a user through illumination of the indicators 118, 120, 106, and/or 110, as appropriate, according to defined modes. The error codes may be displayed by flashing or blinking the indicators, for example. Referring to Table 1, below, several examples of error codes and illumination modes are shown. Specifics regarding detection and effects of each error code are omitted inasmuch as such details are not considered necessary to obtain a complete understanding of the present invention, and are considered to be within the understanding of persons of ordinary skill in the relevant art. The listing in Table 1 is illustrative, only. In an embodiment, additional, fewer, or different error codes and illumination modes may be provided.

TABLE 1

| ERROR CODES | | |
| --- | --- | --- |
| ILLUMINATION MODE | ERROR EXPLANATION | SOLUTION: |
| 120D, flashing | Detected battery type does not match the Battery Type selection | Press the START/STOP/ button; verify the battery matches the selected type; verify balance connector is plugged in (if required) |
| 120C, flashing | Battery or cell voltage is too high or too low to charge safely | Verify balance connector is plugged in (if required); disconnect battery and check condition |
| 120B, flashing | Charge cycle timed out without reaching the target battery voltage. | Disconnect battery and check condition. |
| 120A, flashing | A preferred battery iD is detected but not readable by the battery charger. | Contact customer support |
| 120B-D, flashing | The battery charger internal temperature is too high. | Power off the battery charger to allow charger to cool off. |

As shown in FIG. 5, the first battery charger 100 may be implemented with a plug 126 for operably connecting the first battery charger 100 to an external power supply. In the embodiment shown, the plug 126 may comprise a standard A/C plug for insertion into a wall outlet.

Additionally, in some embodiments, the first battery charger 100 may be implemented with an audible enunciator device (not shown), such as a speaker. In such embodiments, the audible enunciator device may be configured to alert the user of changes in a status or condition of the first battery charger 100. For example, the first battery charger 100 may be implemented with a speaker for making a sound, such as a tone, beep, or the like, to indicate that the first battery charger 100 has completed charging a battery. Additionally, the speaker may be configured to produce alternative sounds for indicating other statuses, or conditions, of the first battery charger 100 such as error alert tones or beeps indicating a change to a charging operation parameter.

Figure 9:
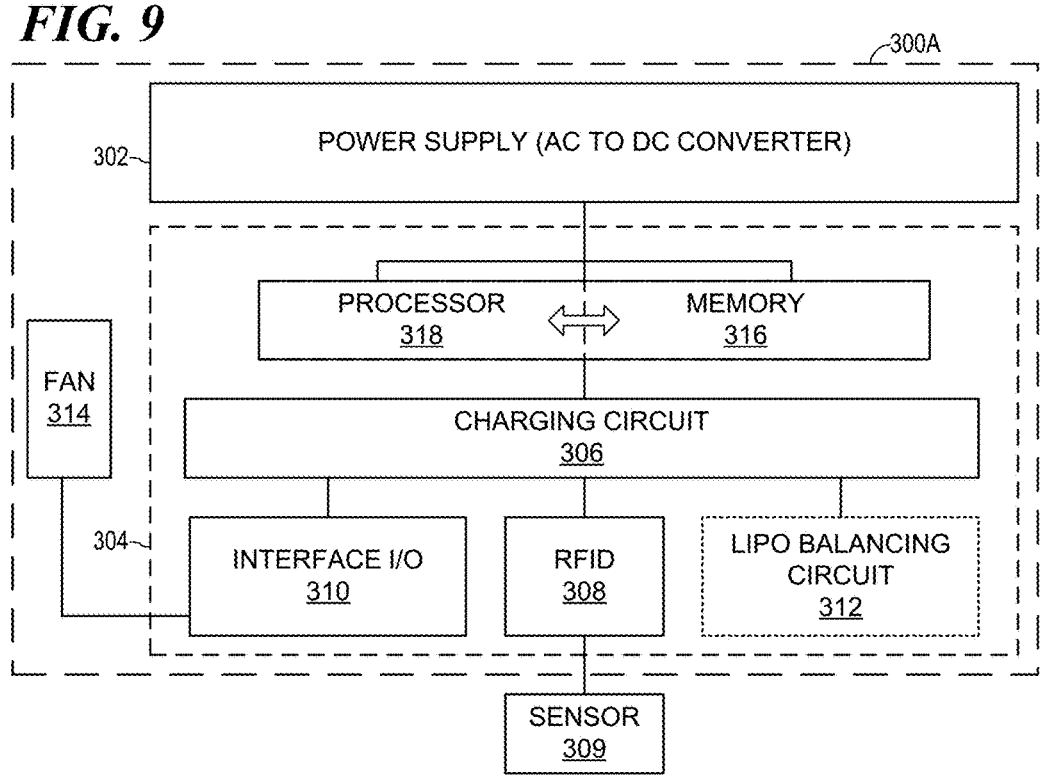
FIG. 9 is a block diagram of an embodiment of a component configuration 300A of the first battery charger 100.

Referring now to FIG. 9, a block diagram of an embodiment of a component configuration 300A of the first battery charger 100 is shown. The first battery charger 100 may comprise the component configuration 300 which may include one or more balancing circuits 312, a charging circuit 306, power supply circuitry 302, a processor 318, a memory 316, an I/O interface 310, and a fan 314. The first battery charger 100 may additionally comprise an RFID sensor 309.

As shown in FIG. 9, in an embodiment, the power supply circuit 302 may be an AC to DC converter circuit for converting AC current received by the first battery charger 100 to DC current. The power supply circuit 302 may comprise any known components or methods for power conversion comprising the prior art that may be suitable for use in a battery charger having the capabilities described in reference to the battery charger embodiments described, herein.

As shown in FIG. 9, in an embodiment, the charging circuit 306 may be operably connected to the power supply circuit 302 and may be configured to provide a charge current for charging a battery in accordance with desired charging parameter settings. The charging circuit 306 may comprise any known components or methods for configuring the DC current received from the power supply circuit 302 comprising the prior art that may be suitable for use in a battery charger having the capabilities described in reference to the battery charger embodiments described, herein. The charging circuit 306 may be capable of configuring a charge current suitable for charging batteries of the type and size described, herein, and in accordance with known charging methods, such as: peak voltage detection charging; constant voltage constant current charging; trickle charging; balance charging; storage charging; and the like.

The controls components 300 may include an RFID reader 308 for establishing RF communication with batteries implemented with an RFID tag to receive data from the battery for use in configuring the charge current provided by the first battery charger 100. The RFID reader 308 may be operably connected to a processor 318 and/or an interface I/O 310 and may communicate data received from a battery implemented with an RFID tag to those components. The RFID reader 308 may be of the type and have the functional capabilities as described in U.S. Provisional Patent Application, Ser. No. 62/007,403 filed on Jun. 3, 2014, titled "Intelligent Battery-Powered System Connector."

The interface I/O 310 may receive and route data from and between the components comprising the controls components 300 of the battery charger 100. The interface I/O may operably connect to any other components comprising the controls components 300 through any operable connection methods comprising the prior art for sending and/or receiving signals, physical communications, and/or logical communications. In a particular embodiment, the interface I/O 310 may be configured to receive data from the RFID reader 308 and direct the received data to other components, such as the processor 318, the charging circuit 306, a LiPo balancing circuit 312, or the like. In an alternative embodiment, the controls components 300 may not include an interface I/O 310. In such embodiments, the components comprising the controls components 300 may be configured to communicate directly through wired or wireless connections between the components.

As shown in FIG. 9, the controls components 300 may include one or more LiPo balancing circuit 312 for providing low amperage balance charge currents for use in charging LiPo type batteries. The LiPo balancing circuits 312 may operably connect to other components such as the RFID reader 308, the interface I/O 310, the charging circuit 306, the power supply circuit 302, the memory 316, and/or the processor 318. The LiPo balancing circuits 312 may comprise any known components or methods for balance charging a LiPo battery comprising the prior art that may be suitable for use in a battery charger having the capabilities and features described in reference to the first battery charger 100, herein. The LiPo balancing circuits 312 may be capable of configuring a balance charge current suitable for charging batteries of the type and size described herein and in accordance with known charging methods, such as: peak voltage detection charging; constant voltage constant current charging; trickle charging; balance charging; storage charging; and the like.

As shown in FIG. 9, in an embodiment, the controls components 300 may include a fan 314 that may circulate air within the first battery charger 100 to cool the controls components 300 during battery charger 100 operation. The fan 314 may comprise any fan of any type or size comprising the prior art that may be suitable for use in a battery charger having the capabilities described in reference to the first battery charger 100, herein.

The controls components 300 may be implemented with a memory 316 for storing code, operational logic, instructions, predefined settings, or other data which may be used for operation and control of the first battery charger 100. In an embodiment, the memory 316 may store a listing of battery identifiers for matching to an identifier that may be stored on an RFID tag of a battery to be charged. The memory 316 may be a volatile memory or a non-volatile memory of any type comprising the prior art. The memory 316 may include an optical, magnetic (hard drive) or any other form of data storage device. In one embodiment, the memory 316 may be built into the processor 318.

The memory 316 may store computer executable instructions. The processor 318 may execute computer executable instructions. The computer executable instructions may be included in computer code. The computer code may be stored in the memory 316. The computer code may be written in any computer language comprising the prior art. The memory 316 may be a non-transitory tangible storage media.

The computer code may be logic encoded in one or more tangible media or one or more non-transitory tangible media for execution by the processor 318. Logic encoded in one or more tangible media for execution may be defined as instructions that are executable by the processor 318 and that are provided on the computer-readable storage media, memories, or a combination thereof. Logic may include a software controlled microprocessor, an application specific integrated circuit (ASIC), an analog circuit, a digital circuit, a programmed logic device, a memory device containing instructions, and the like. The instructions may be stored on any computer readable medium comprising the prior art from which a computer, a processor, or other electronic device can read.

The processor 318 may include a general processor, digital signal processor, ASIC, field programmable gate array, analog circuit, digital circuit, central processing unit (CPU), micro-processor unit (MPU), micro-controller unit (MCU), combinations thereof, or other now known processor. The processor 318 may be a single device or combinations of devices, such as associated with a network or distributed processing. The processor 318 may be responsive to or operable to execute instructions stored as part of software, hardware, integrated circuits, firmware, microcode or the like. The functions, acts, methods or tasks illustrated in the figures or described herein may be performed by the processor 318 executing instructions stored in the memory 316.

Figure 10:
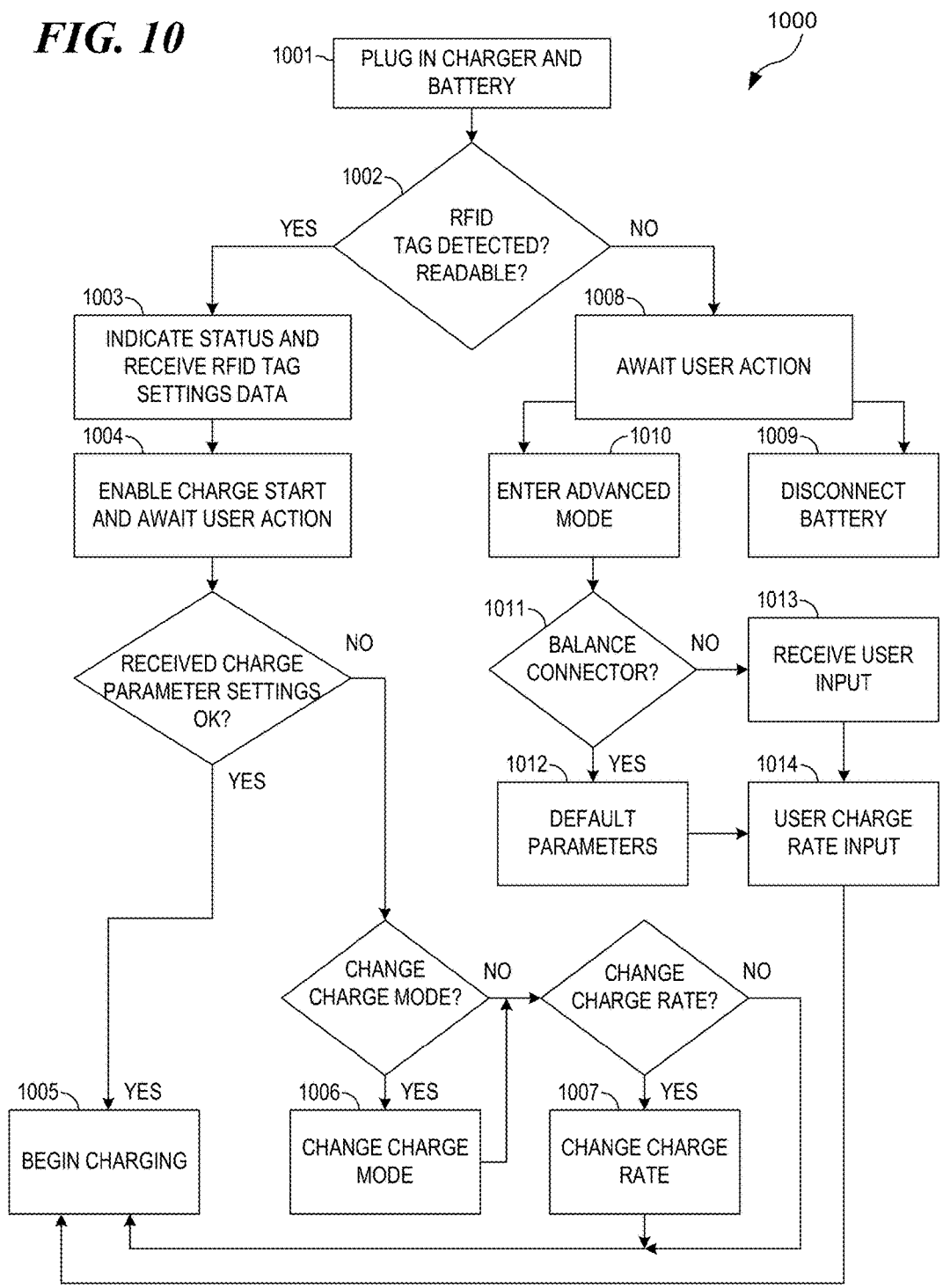
FIG. 10 is a flowchart showing an embodiment of system operation 1000 of a battery charger.

The memory 316 may store a predefined set of instructions that may be used by the processor 318 to control the operation of the first battery charger 100. The processor 318 may receive input from the user of the first battery charger 100, from the battery to be charged through an RF connection with the battery, or from both sources. The processor may respond to input received from the user, or from the battery, or both, to configure the charge current of the first battery charger 100, to initiate or terminate charging operation, initiate or change an indicator communicating an operational status or parameter of the first battery charger 100, or some other similar response. Turning now to FIG. 10, a method 1000 illustrating operational steps of an embodiment of the first battery charger 100 is shown. At Step 1001, the user may plug in the first battery charger 100 to a power source. The first battery charger 100 may indicate that power is being received and that a battery may be connected by illuminating the Charge Rate/Progress indicators 120 in a "runway" pattern, followed by slow flashing of the Charge Status indicator 118. The user may connect the battery to be charged to the charger output port 114. Additionally, the user may connect a balance port connector of the battery to be charged to the appropriately sized balance port 116 of battery charger 100 if the battery to be charged is a LiPo type battery and is not implemented with an RFID tag.

At Step 1002, the first battery charger 100 may determine if the battery connected to the charger output port 114 is implemented with a readable RFID tag. If the battery inserted is implemented with an RFID tag that is readable by the sensor device 309 of the first battery charger 100, the first battery charger 100 may indicate to the user that a "smart" battery has been detected by illuminating the first switch 102, which may be the "Start/Stop" labeled push button, at Step 1003. Also at Step 1003, the first battery charger 100 may receive information from the RFID tag of the battery to be charged and configure the charging parameters of the first battery charger 100 in accordance with the information received from the battery to be charged and from default settings of the first battery charger 100. Illumination of the "Start/Stop" button may indicate to the user that the first battery charger 100 is ready to begin supplying a charge current to the battery and will do so upon the user pressing and holding the "Start/Stop" button for 2 seconds.

At Step 1004, the battery charger may wait for user action. If the first battery charger 100 charging parameters are acceptable as configured, the user may begin charging operation by the first battery charger 100 by pressing and holding the "Start/Stop" button for 2 seconds at Step 1005.

If desired, the user may change the Charge Mode of the first battery charger 100 at Step 1006, by pressing the "Charge Mode" push button, switch 112, to toggle between available modes. During user selection of a Charge Mode at Step 1006, the first battery charger 100 may remain ready to begin supplying a charge current to the battery to be charged. The user may begin charging operation by the first battery charger 100 at any time by pressing and holding the "Start/Stop" button for 2 seconds.

Additionally, if desired, the user may change the Charge Rate of the first battery charger 100 at Step 1007, by simultaneously pressing and holding the "Start/Stop" and the "Charge Rate" push buttons, switches 102 and 104, respectively, for 2 seconds. This may place the first battery charger 100 in "Advanced Mode." The Charge Rate/Progress indicator 120 corresponding to the currently selected Charge Rate may begin flashing to indicate to the user that the battery charger is awaiting a Charge Rate selection by the user. The user may then change the Charge Rate to a desired setting by pressing the "Charge Rate" push button, the second switch 104, to toggle between available Charge Rates. During user selection of a Charge Rate at Step 1007, the first battery charger 100 may remain ready to begin supplying a charge current to the battery to be charged. The user may begin charging operation by the first battery charger 100 at any time by pressing and holding the "Start/Stop" button for 2 seconds.

Although the method 1000, as shown in FIG. 10, orders the Charge Mode change step, Step 1006, before the Charge Rate change step, Step 1007, it should be noted that these steps may be performed in any order, relative to one another. For example, a user may elect to change the Charge Rate, first, before changing the Charge Mode.

Returning to Step 1002, if the first battery charger 100 determines that the connected battery is not implemented with an RFID tag, or is implemented with an unreadable RFID tag, the first battery charger 100 may indicate this status to the user at Step 1008. At Step 1008, the first battery charger 100 may illuminate the Charging Rate/Status indicators 120 in a sweeping manner. Additionally, the "Start/Stop" push button may not illuminate. The battery charger may be configured to remain in this state and await action by the user.

The user may elect to disconnect and reconnect the battery, at Step 1009, returning to Step 1001. The user may elect to take this action in instances where the battery connected is implemented with an RFID tag but an RFID connection was not made with the first battery charger 100 during coupling of the battery and the first battery charger 100.

Alternatively, the user may elect to enter "Advanced Mode" at Step 1010, by simultaneously pressing and holding the "Start/Stop" and the "Charge Rate" push buttons, switches 102 and 104, respectively, for 2 seconds. The user may elect this action when the battery to be charged is not implemented with an RFID tag.

The first battery charger 100 may determine whether a balance port connector has been electrically connected to a balance port 116 at Step 1011. If a balance connector is detected, the first battery charger 100 may select default charging parameter settings, such as setting the Battery Type to "LiPo" and setting the Charge Mode to "Balance" at Step 1012.

If no balance connector is detected, the first battery charger 100 may prompt the user to select a Battery Type by illuminating the Battery Type selection indicators 110 in an alternating manner at Step 1013. The user may select a Battery Type by pressing the "Battery Type" push button, the switch 108, until the Battery Type selection indicator 110 corresponding to the desired Battery Type is illuminated. The first battery charger 100 may select a default Charge Mode based on the Battery Type selected. For example, Balance mode may be selected for LiPo batteries and Fast mode selected for NiMH batteries. Additionally, the first battery charger 100 may be configured to indicate a Battery Type mismatch error if the user selects the "LiPo" Battery Type and the first battery charger 100 does not detect a balance connector coupled to a balance connector port 116, at Step 1013.

At Step 1014, the first battery charger 100 may prompt the user to select a Charge Rate by illuminating the Charge Rate/Progress indicator 120A in a flashing mode. The user may select a Charge Rate by pressing the "Charge Rate" push button, the switch 104, to toggle between available Charge Rates until the Charge Rate/Progress indicator 120 corresponding to the desired Charge Rate is illuminated. Once the user selects a Charge Rate, the first battery charger 100 may be configured to begin supplying a charge current to the battery to be charged. The user may begin charging operation by the first battery charger 100 by pressing and holding the "Start/Stop" button for 2 seconds.

Once charging commences, regardless of the Battery Type, Charge Mode, or Charge Rate selections, the Charge Status indicator 118 may be configured to continuously "blink," indicating that a charging is in progress. The Charge Rate/Progress indicators 120 may also illuminate to display the amount of charge contained by the battery relative to the peak charge of the battery. The first battery charger 100 may continuously monitor for undue delay in peak charge detection or over-temperature conditions using thermocouples, infrared radiation, and other methods.

The charge process may be halted by the occurrence of a peak charge detection timeout, or an over-temperature condition. Additionally, the charging may be halted by the user pressing the "Start/Stop" button or disconnecting the battery. If the "Start/Stop" button is pressed the first battery charger 100 may revert to its pre-charging configuration, with indicators illuminated to show current parameter setting selections. If the battery is disconnected during charging, the first battery charger 100 may be configured to illuminate the Charge Rate/Progress indicators in the "runway" pattern, indicating that the first battery charger 100 is awaiting coupling of a battery to the charge output port 114.

Alternatively, if the charging process is not interrupted, and reaches completion, the Charge Status indicator 118 may be configured to cease blinking and illuminate solidly. Further, the Charge Rate/Progress indicators 120 may turn off. The first battery charger 100 may automatically begin "trickle charging" the battery for up to a pre-set amount of time while waiting for the user to disconnect the battery.

Having described the features and capabilities of several embodiments of a battery charger according to the present invention, along with a method of operation for the battery charger, several illustrative examples of battery charger use are now provided.

Figure 11:
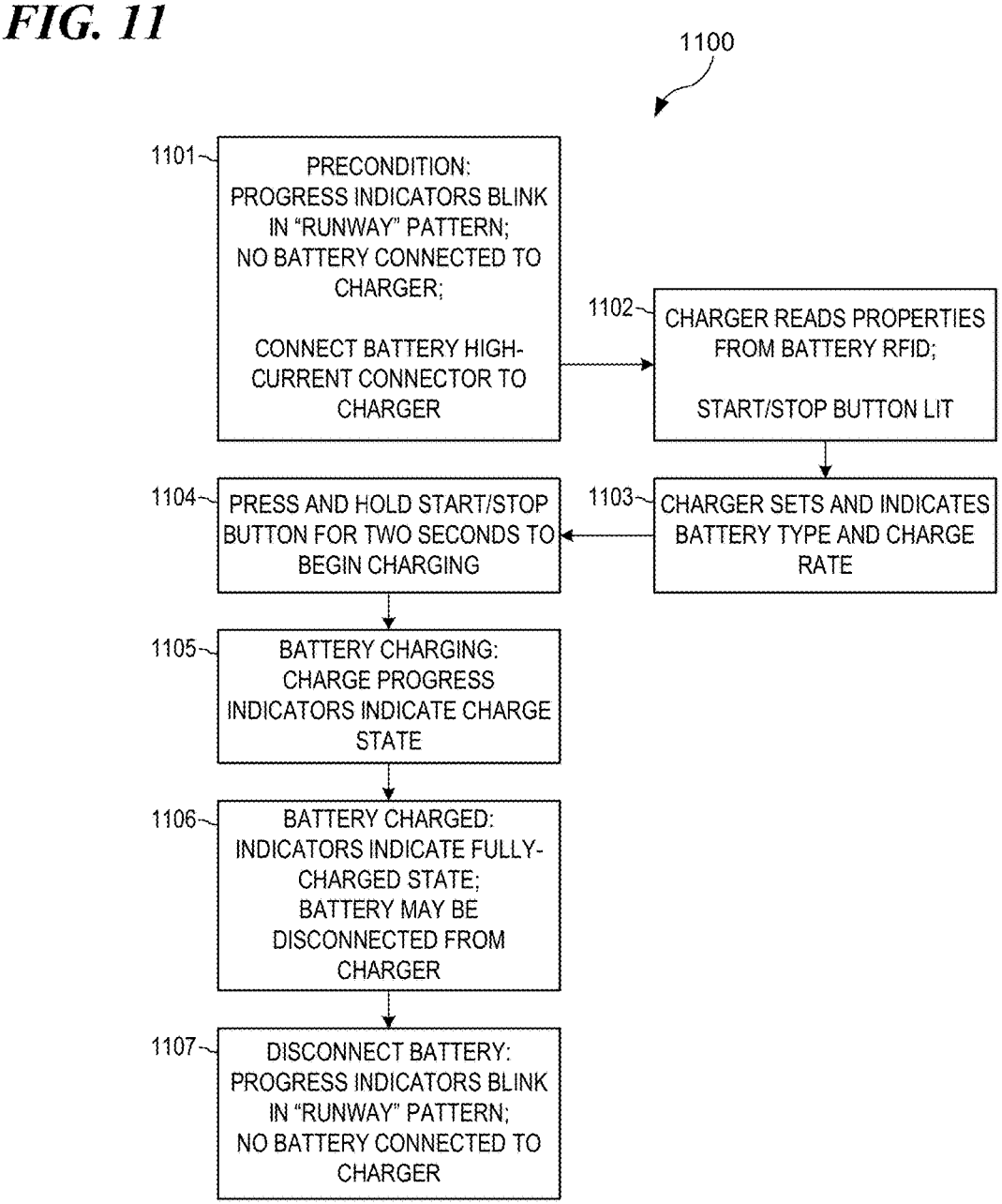
FIG. 11 is a flowchart illustrating a mode of operation of a battery charger.

The first battery charger 100 may be used in accordance with method 1000 to balance charge a "smart" LiPo type battery implemented with an RFID chip using the RFID defined and default settings, as shown in FIG. 11. At Step 1101, the battery charger may be electrically connected to a power supply and the "smart" LiPo battery may be connected to the charge output port. The battery charger may then detect the RFID tag and respond by illuminating the "Start/Stop" button at Step 1102. The battery charger may then receive information from the battery RFID tag and may set the battery charger operating parameters to the "LiPo," "Balance," and "4A" settings at Step 1103. The user may then commence charging by pressing and holding the "Start/Stop" button for 2 seconds at Step 1104.

At Step 1105, battery charging commences and the Charge Status indicator 118 "blinks." The Charge Rate/Progress indicators 120 also illuminate to display the amount of charge contained by the battery relative to the peak charge of the battery.

At Step 1106, the charging process completes, the Charge Status indicator 118 may be configured to cease blinking and illuminate solidly. Further, the Charge Rate/Progress indicators 120 may turn off. The first battery charger 100 may automatically begin "trickle charging" the battery for up to a pre-set amount of time while waiting for the user to disconnect the battery. Once the battery is disconnected, at Step 1107, the first battery charger 100 may illuminate the Charge Rate/Progress indicators in the "runway" pattern, indicating that the first battery charger 100 is awaiting coupling of a battery to the charge output port 114.

Figure 12:
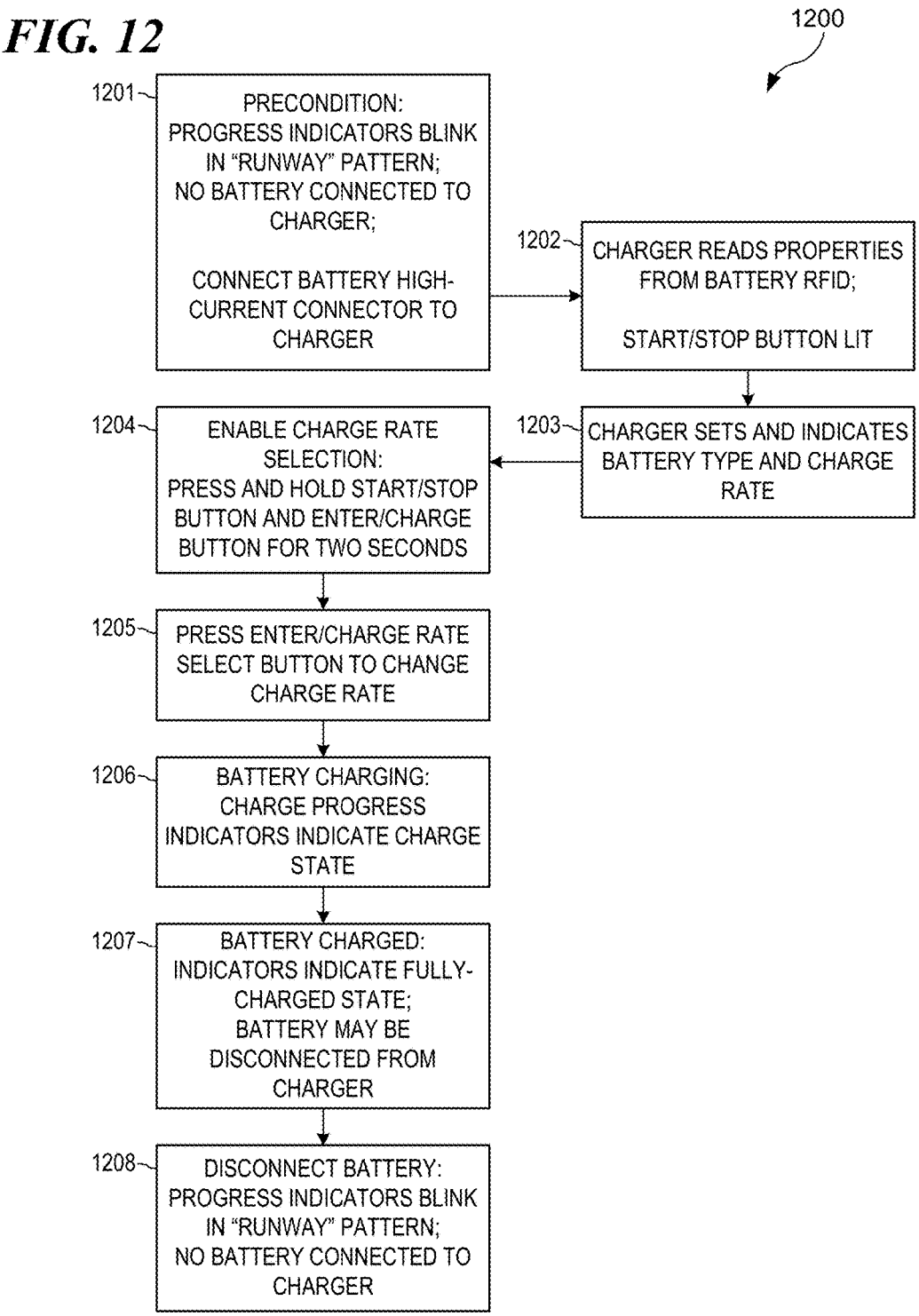
FIG. 12 is a flowchart illustrating a mode of operation of a battery charger.

The first battery charger 100 may be used in accordance with method 1000 to balance charge a "smart" LiPo battery implemented with an RFID chip and using "Advanced Mode" to select the "2A" Charge Rate, as shown in FIG. 12. At Step 1201, the battery charger may be electrically connected to a power supply and the "smart" LiPo battery may be connected to the charge output port. The battery charger may then detect the RFID tag and respond by illuminating the "Start/Stop" button at Step 1202. The battery charger may then receive information from the battery RFID tag and may set the battery charger operating parameters to the "LiPo," "Balance," and "4A" settings at Step 1203.

At Step 1204, the user may change the Charge Rate of the first battery charger 100 using "Advanced Mode" by simultaneously pressing and holding the "Start/Stop" and the "Charge Rate" push buttons for 2 seconds. The Charge Rate/Progress indicator 120 corresponding to the currently selected Charge Rate may begin flashing to indicate to the user that the battery charger is awaiting a Charge Rate selection by the user.

At Step 1205, the user may change the Charge Rate to a desired setting of "2A" by pressing the "Charge Rate" push button twice. During user selection of a Charge Rate at Step 1205, the first battery charger 100 may remain ready to begin supplying a charge current to the battery to be charged. The user may begin charging operation at Step 1206 by pressing and holding the "Start/Stop" button for 2 seconds.

At Step 1206, battery charging commences and the Charge Status indicator 118 "blinks." The Charge Rate/Progress indicators 120 also illuminate to display the amount of charge contained by the battery relative to the peak charge of the battery. At Step 1207, the charging process completes, the Charge Status indicator 118 may be configured to cease blinking and illuminate solidly. Further, the Charge Rate/Progress indicators 120 may turn off. The first battery charger 100 may automatically begin "trickle charging" the battery for up to a pre-set amount of time while waiting for the user to disconnect the battery.

Once the battery is disconnected, at Step 1208, the first battery charger 100 may illuminate the Charge Rate/Progress indicators in the "runway" pattern, indicating that the first battery charger 100 is awaiting coupling of a battery to the charge output port 114.

Figure 13:
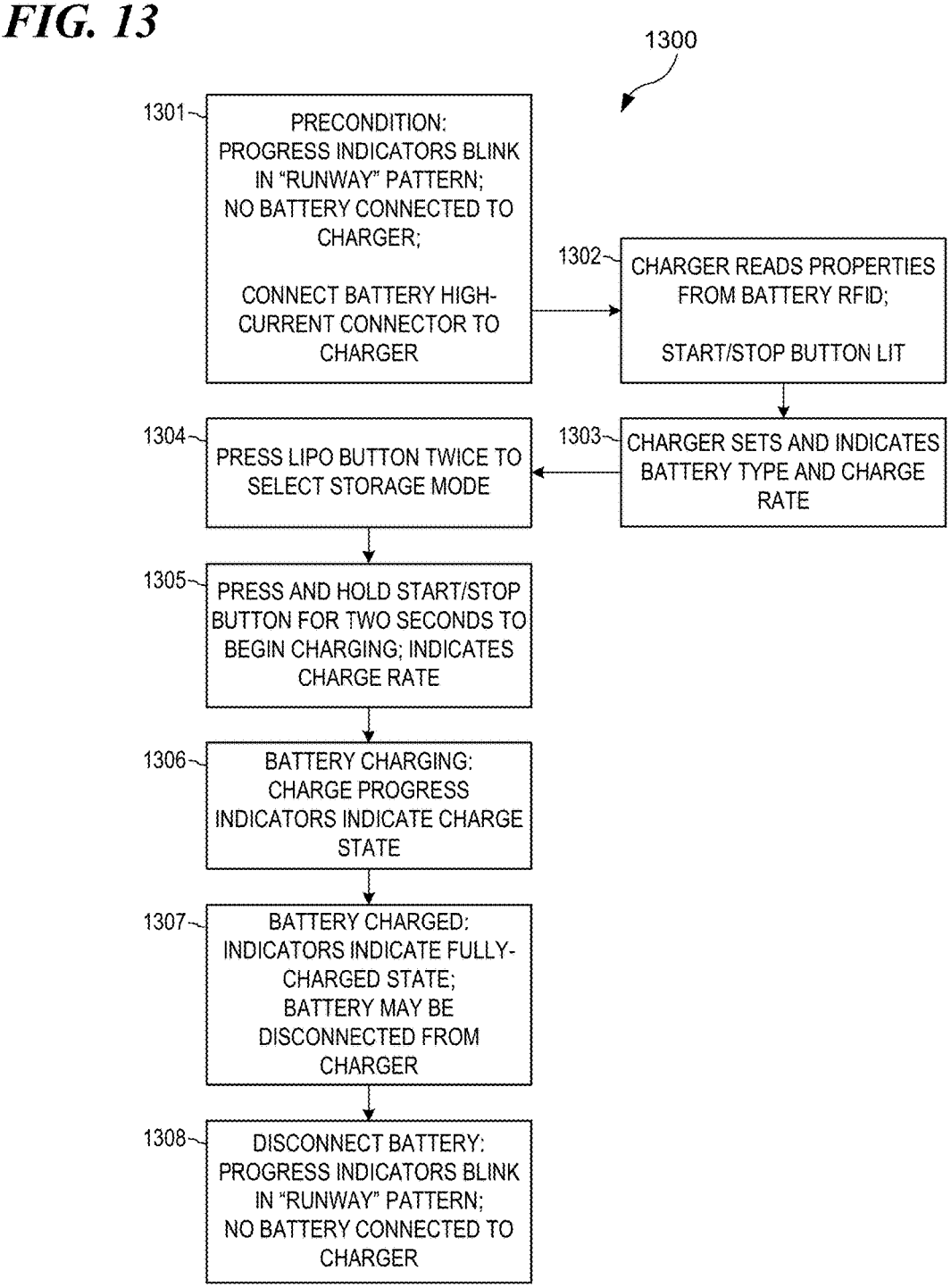
FIG. 13 is a flowchart illustrating a mode of operation of a battery charger.

The first battery charger 100 may be used in accordance with method 1000 to charge a "smart" LiPo battery implemented with an RFID chip for storage, as shown in FIG. 13. At Step 1301, the battery charger may be electrically connected to a power supply and the "smart" LiPo battery may be connected to the charge output port. The battery charger may then detect the RFID tag and respond by illuminating the "Start/Stop" button at Step 1302. The battery charger may then receive information from the battery RFID tag and may set the battery charger operating parameters to the "LiPo," "Balance," and "4A" settings at Step 1303.

At Step 1304, the user may change the Charge Mode of the first battery charger 100 by pressing the "Charge Mode," or "LIPO" push button until "Storage" mode is selected. During user selection of a Charge Mode at Step 1304, the first battery charger 100 may remain ready to begin supplying a charge current to the battery to be charged. The user may begin charging operation by pressing and holding the "Start/Stop" button for 2 seconds at step 1305.

At Step 1306, battery charging commences and the Charge Status indicator 118 "blinks." The Charge Rate/Progress indicators 120 also illuminate to display the amount of charge contained by the battery relative to the peak charge of the battery. At Step 1307, the charging process completes, the Charge Status indicator 118 may be configured to cease blinking and illuminate solidly. Further, the Charge Rate/Progress indicators 120 may turn off.

Once the battery is disconnected, at Step 1308, the first battery charger 100 may illuminate the Charge Rate/Progress indicators in the "runway" pattern, indicating that the first battery charger 100 is awaiting coupling of a battery to the charge output port 114.

Figure 14:
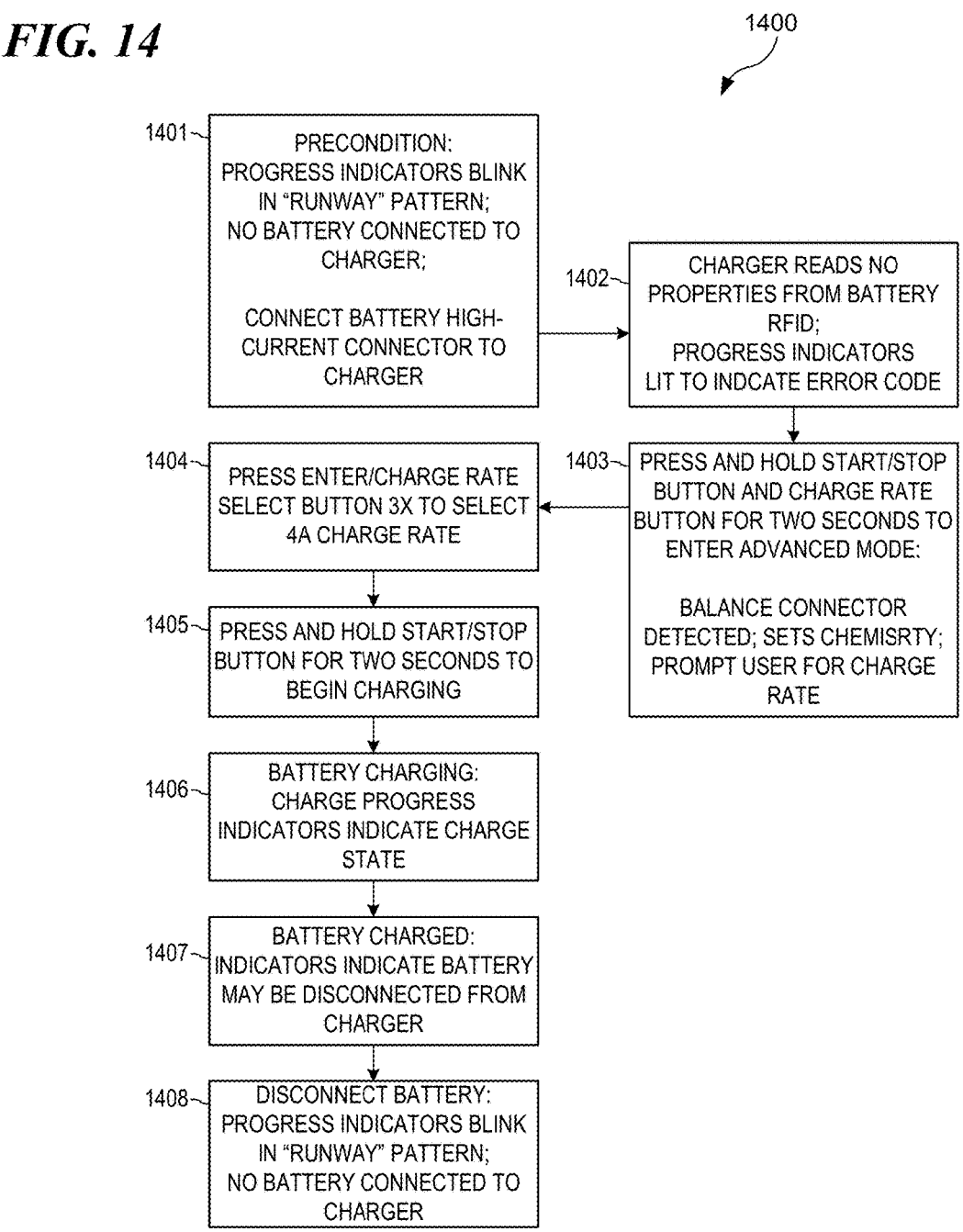
FIG. 14 is a flowchart illustrating a mode of operation of a battery charger.

The first battery charger 100 may be used in accordance with method 1000 to balance charge a LiPo battery without an RFID chip, as shown in FIG. 14. At Step 1401, the battery charger may be electrically connected to a power supply and the LiPo battery may be connected to the charge output port. Additionally, a balance connector may be connected to a balance port of the battery charger at Step 1401.

At Step 1402, the battery charger may detect that the battery is not implemented with an RFID tag and respond by illuminating the Charging Rate/Status indicators in a sweeping manner. The battery charger may remain in this state and await action by the user. At Step 1403, the user may elect to enter "Advanced Mode" by simultaneously pressing and holding the "Start/Stop" and the "Charge Rate" push buttons for 2 seconds.

At Step 1403, the battery charger may detect the balance connector electrically connected to a balance port and may set the charging parameter settings to "LiPo" and "Balance." The "1A" Charge Rate/Progress indicator may begin flashing to indicate to the user that the battery charger is awaiting a Charge Rate selection by the user.

At Step 1404, the user may change the Charge Rate to a desired setting of "4A" by pressing the "Charge Rate" push button three times. Upon user selection of a Charge Rate at Step 1404, the first battery charger 100 may become ready to begin supplying a charge current to the battery to be charged. The user may begin charging operation at Step 1405 by pressing and holding the "Start/Stop" button for 2 seconds.

At Step 1406, battery charging commences and the Charge Status indicator 118 "blinks." The Charge Rate/Progress indicators 120 also illuminate to display the amount of charge contained by the battery relative to the peak charge of the battery. At Step 1407, the charging process completes, the Charge Status indicator 118 may be configured to cease blinking and illuminate solidly. Further, the Charge Rate/Progress indicators 120 may turn off. The first battery charger 100 may automatically begin "trickle charging" the battery for up to a pre-set amount of time while waiting for the user to disconnect the battery.

Once the battery is disconnected, at Step 1408, the first battery charger 100 may illuminate the Charge Rate/Progress indicators in the "runway" pattern, indicating that the first battery charger 100 is awaiting coupling of a battery to the charge output port 114.

Figure 15:
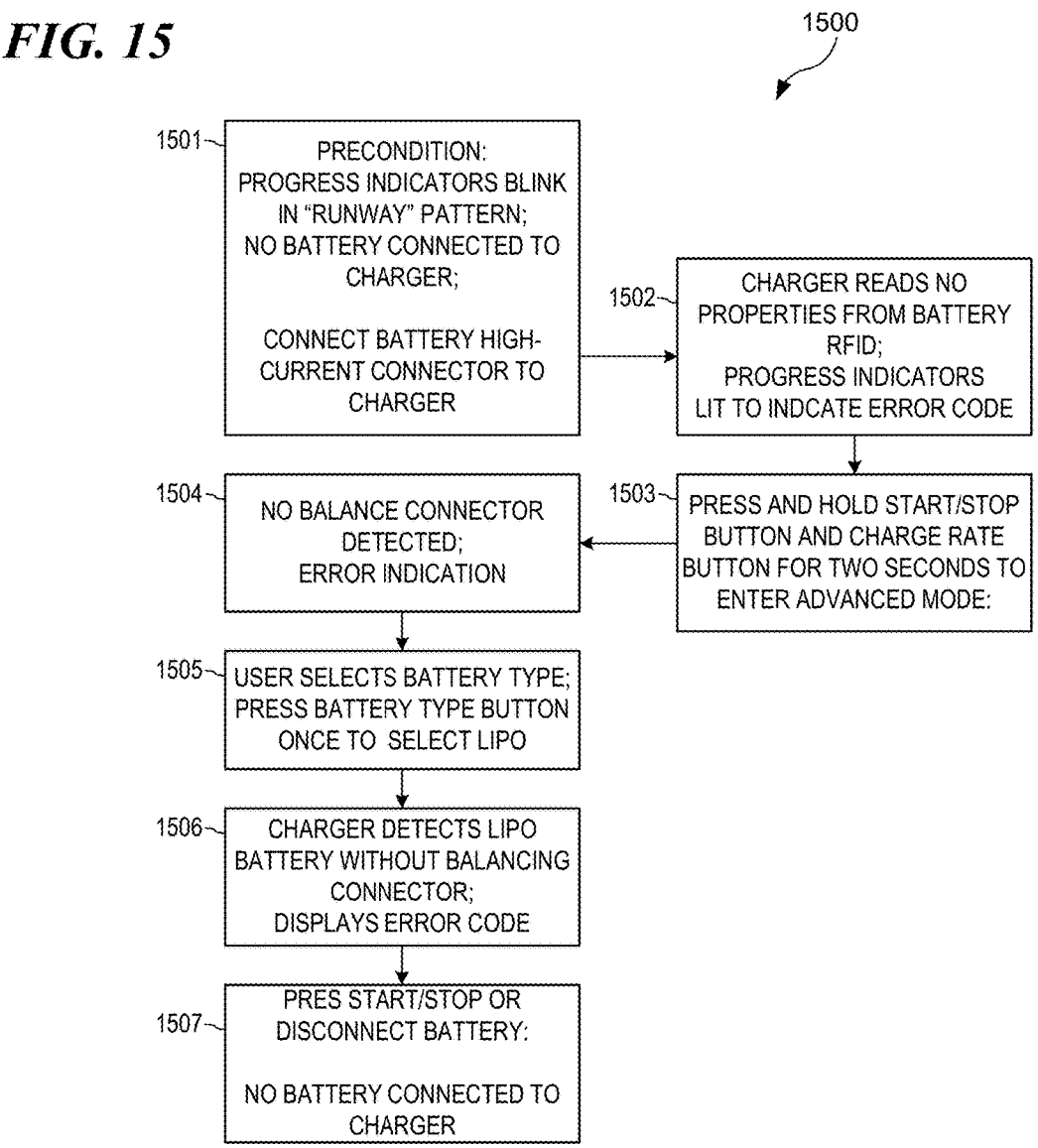
FIG. 15 is a flowchart illustrating a mode of operation of a battery charger.

FIG. 15 illustrates how the battery charger may deter the user from charging a LiPo battery not implemented with an RFID tag without a balance connector coupled to a balance connector port. At Step 1501, the battery charger may be electrically connected to a power supply and the LiPo battery may be connected to the charge output port.

At Step 1502, the battery charger may detect that the battery is not implemented with an RFID tag and respond by illuminating the Charging Rate/Status indicators in a sweeping manner. The battery charger may remain in this state and await action by the user. At Step 1503, the user may elect to enter "Advanced Mode" by simultaneously pressing and holding the "Start/Stop" and the "Charge Rate" push buttons for 2 seconds.

At Step 1504, the battery charger may detect that no balance connector is electrically connected to a balance port and prompt the user to select a Battery Type by illuminating the LiPo and NiMH battery type selection indicators in an alternating manner. The user may select the "LiPo" Battery Type by pressing the "Battery Type" push button once at Step 1505. The battery charger may illuminate the "LiPo" Battery Type selection indicator in a solid mode and illuminate the Charge Mode selection indicator corresponding to "Balance."

At Step 1506, the battery charger may detect that "LiPo" is selected while no balance connector is coupled to a balance connector port of the battery charger. The battery charger may indicate the error condition by illuminating the "1A" Charge Rate/Progress indicator in a blinking manner. The "1A" Charge Rate/Progress indicator may continue to blink until the user either disconnects the battery or presses the "Start/Stop" button.

Figure 16:
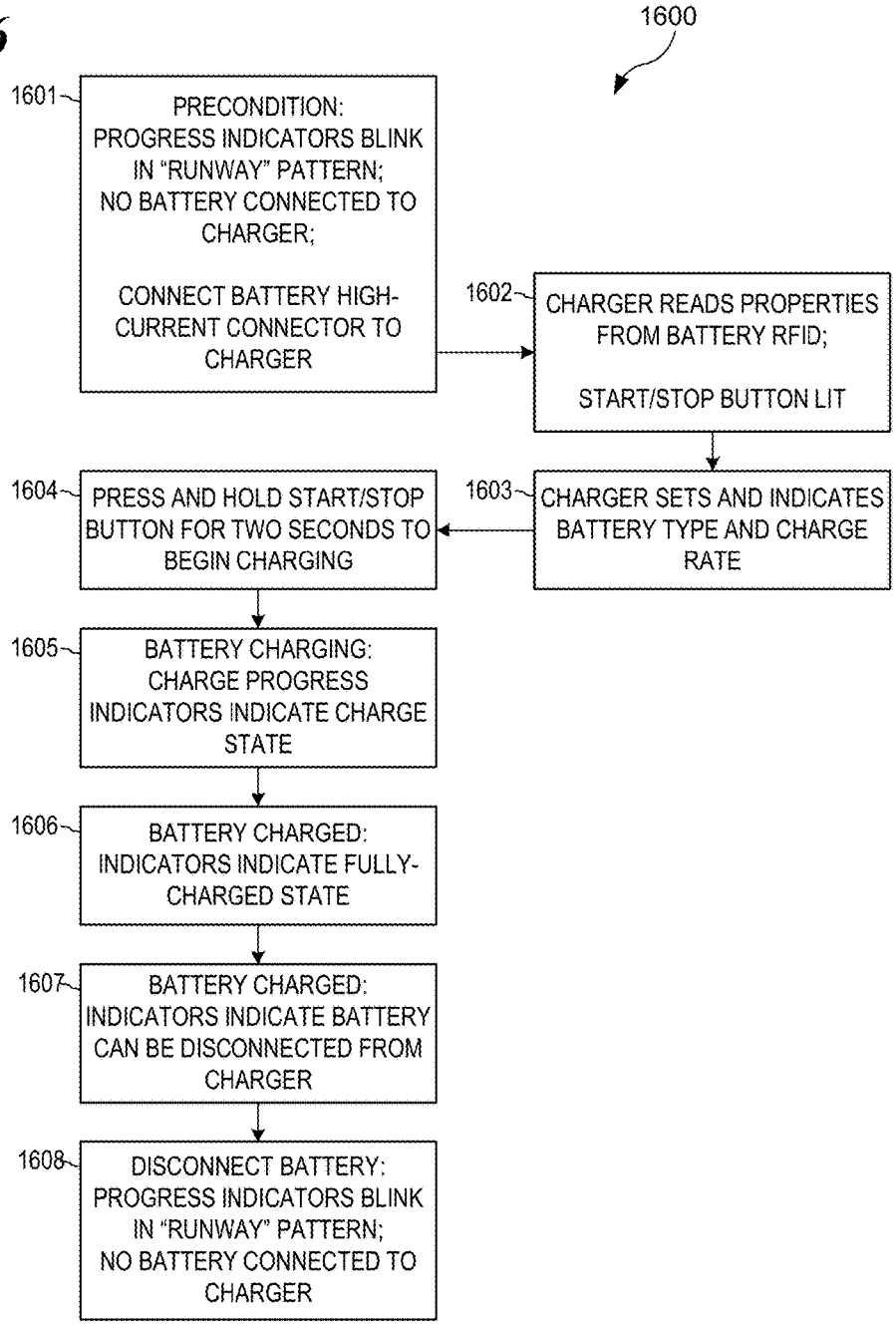
FIG. 16 is a flowchart illustrating a mode of operation of a battery charger.

The first battery charger 100 may be used in accordance with method 1000 to fully charge a "smart" NiMH type battery implemented with an RFID chip using the RFID defined and default settings, as shown in FIG. 16. At Step 1601, the battery charger may be electrically connected to a power supply and the "smart" NiMH battery may be connected to the charge output port. The battery charger may then detect the RFID tag and respond by illuminating the "Start/Stop" button at Step 1602. The battery charger may then receive information from the battery RFID tag and may set the battery charger operating parameters to the "NiMH" and "4A" settings at Step 1603. The user may then commence charging by pressing and holding the "Start/Stop" button for 2 seconds at Step 1604.

At Step 1605, battery charging commences and the Charge Status indicator 118 "blinks." The Charge Rate/Progress indicators 120 also illuminate to display the amount of charge contained by the battery relative to the peak charge of the battery.

At Step 1606, the charging process completes, the Charge Status indicator 118 may be configured to cease blinking and illuminate solidly. Further, the Charge Rate/Progress indicators 120 may turn off. The first battery charger 100 may automatically begin "trickle charging" the battery for up to a pre-set amount of time while waiting for the user to disconnect the battery. Once the battery is disconnected, at Step 1607, the first battery charger 100 may, in Step 1608, illuminate the Charge Rate/Progress indicators in the "runway" pattern, indicating that the first battery charger 100 is awaiting coupling of a battery to the charge output port 114.

Figure 17:
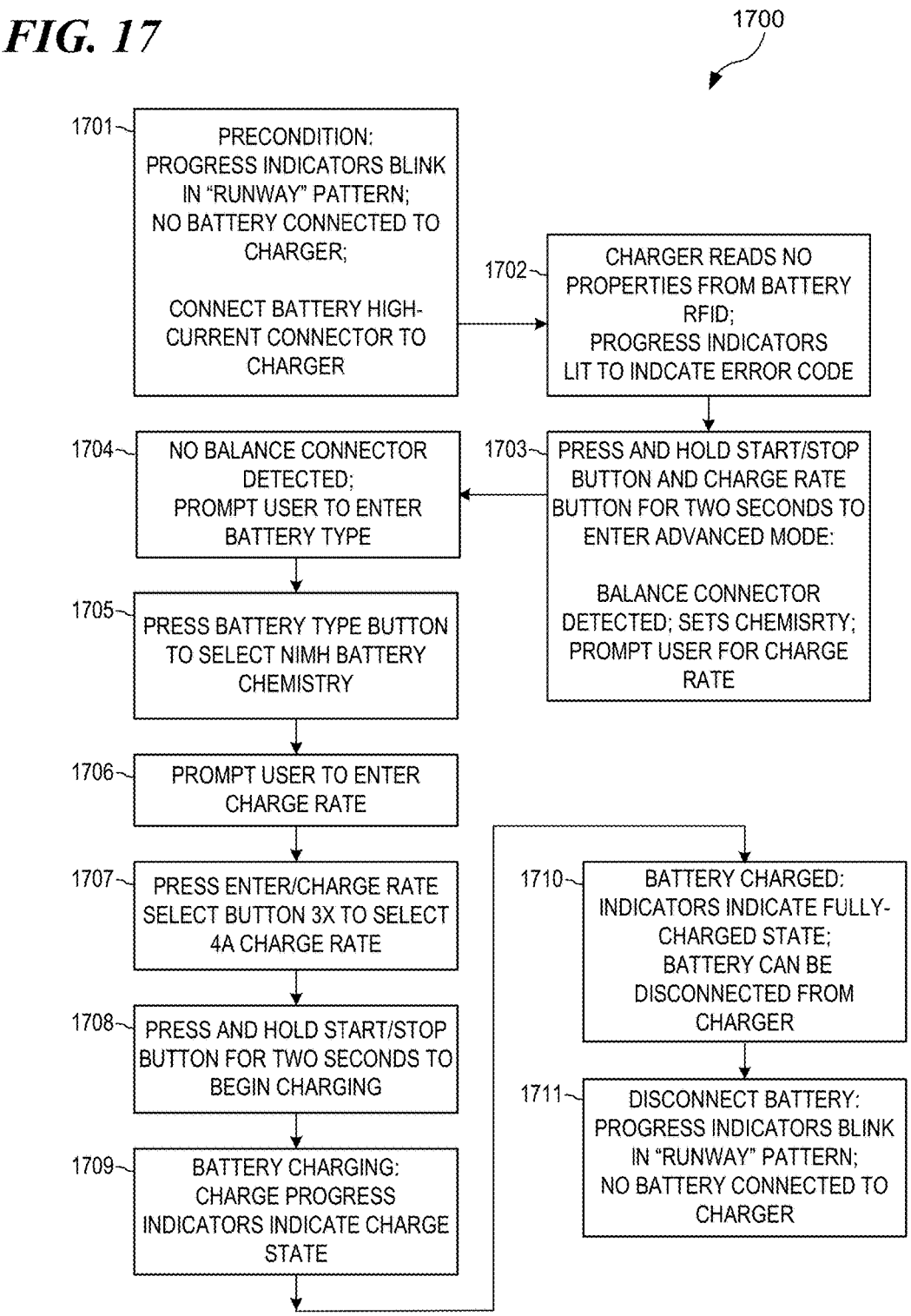
FIG. 17 is a flowchart illustrating a mode of operation of a battery charger.

The first battery charger 100 may be used in accordance with method 1000 to fully charge a NiMH battery without an RFID chip, as shown in FIG. 17. At Step 1701, the battery charger may be electrically connected to a power supply and the NiMH battery may be connected to the charge output port.

At Step 1702, the battery charger may detect that the battery is not implemented with an RFID tag and respond by illuminating the Charging Rate/Status indicators in a sweeping manner. The battery charger may remain in this state and await action by the user. At Step 1703, the user may elect to enter "Advanced Mode" by simultaneously pressing and holding the "Start/Stop" and the "Charge Rate" push buttons for 2 seconds.

At Step 1704, the battery charger may detect that no balance connector is electrically connected to a balance port and prompt the user to select a Battery Type by illuminating the "LiPo" and "NiMH" battery type selection indicators in an alternating manner. The user may select the "NiMH" Battery Type by pressing the "Battery Type" push button twice at Step 1705. The battery charger may illuminate the "NiMH" Battery Type selection indicator in a solid mode.

At Step 1706, the "1A" Charge Rate/Progress indicator may begin flashing to indicate to the user that the battery charger is awaiting a Charge Rate selection by the user. At Step 1707, the user may change the Charge Rate to a desired setting of "4A" by pressing the "Charge Rate" push button three times. Upon user selection of a Charge Rate, the first battery charger 100 may become ready to begin supplying a charge current to the battery to be charged. The user may begin charging operation at Step 1708 by pressing and holding the "Start/Stop" button for 2 seconds.

At Step 1709, battery charging commences and the Charge Status indicator 118 "blinks." The Charge Rate/Progress indicators 120 also illuminate to display the amount of charge contained by the battery relative to the peak charge of the battery. At Step 1710, the charging process completes, the Charge Status indicator 118 may be configured to cease blinking and illuminate solidly. Further, the Charge Rate/Progress indicators 120 may turn off. The first battery charger 100 may automatically begin "trickle charging" the battery for up to a pre-set amount of time while waiting for the user to disconnect the battery.

Once the battery is disconnected, at Step 1711, the first battery charger 100 may illuminate the Charge Rate/Progress indicators in the "runway" pattern, indicating that the first battery charger 100 is awaiting coupling of a battery to the charge output port 114.

The Second Battery Charger 200

Figure 6:
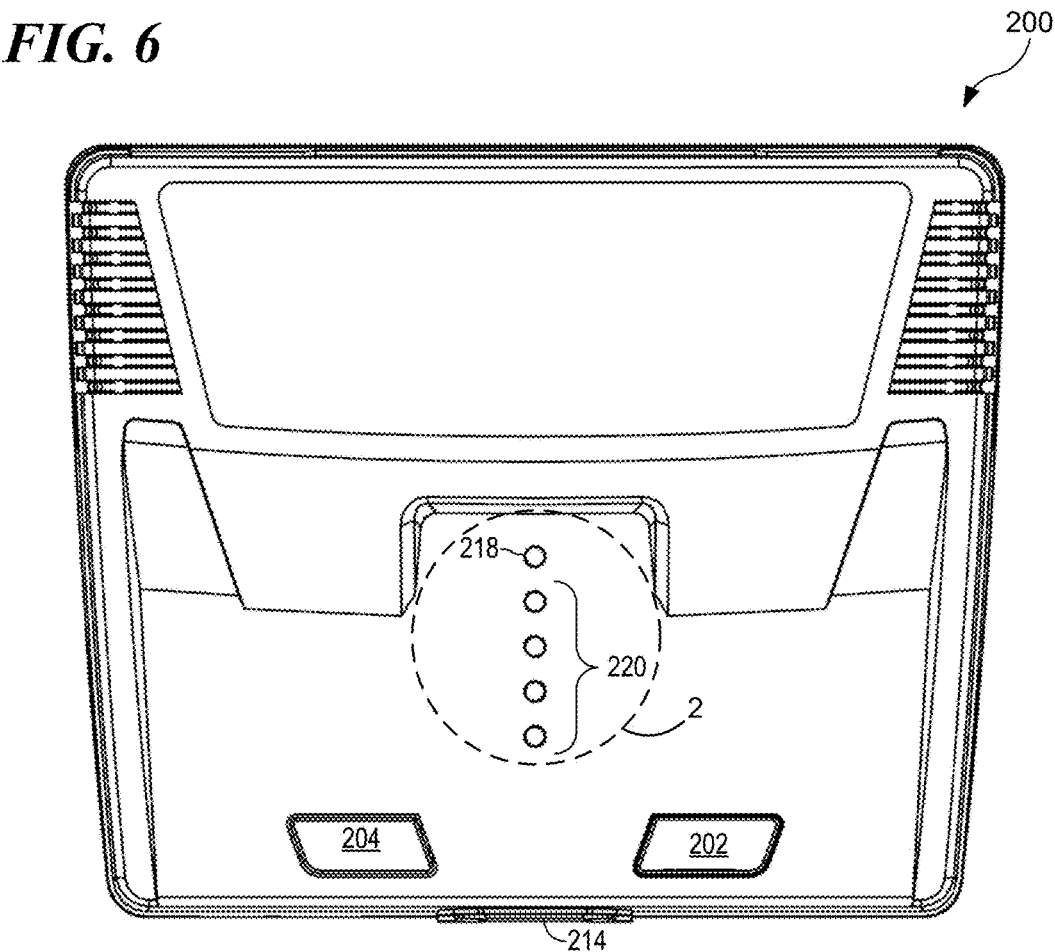
FIG. 6 is a top-down view of an embodiment of a second battery charger 200.
Figure 7:
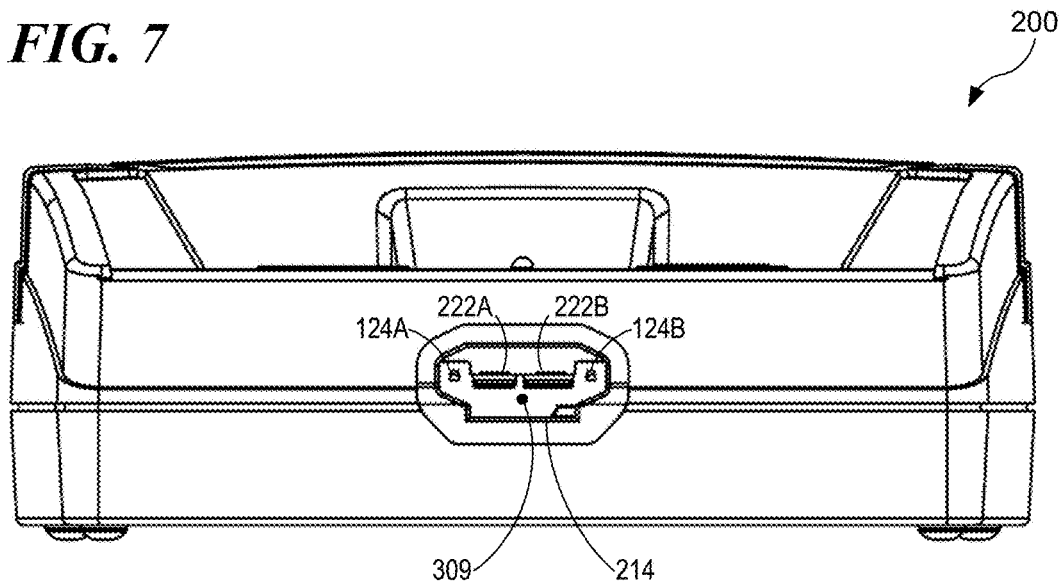
FIG. 7 is a front view of an embodiment of the second battery charger 200.
Figure 8:
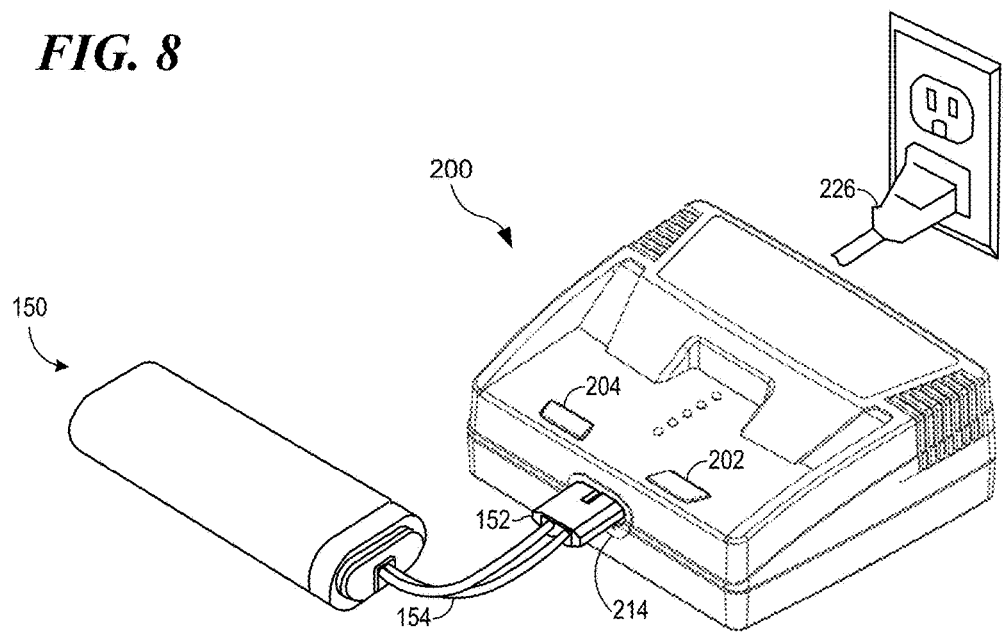
FIG. 8 is a perspective view of an embodiment of the second battery charger 200.

Referring now to FIGS. 6-8, a second embodiment of a battery charger, the second battery charger 200, is shown. The second battery charger 200 may be configured to be compatible with batteries of a specific battery chemistry type. For example, the second battery charger 200 may be configured to charge only NiMH type batteries. Accordingly, the second battery charger 200 may be a "simplified" version of the first battery charger 100 and may be implemented with fewer components than the first battery charger 100.

The second battery charger 200 may comprise a charger output port 214 for coupling the second battery charger 200 to a rechargeable battery, a sensor device 309 for receiving information from the battery to be charged, two switches 202, 204 for receiving user input, a plurality of status indicators 218, 220, and a plug 226 for connecting the battery charger to a power supply.

As shown in FIG. 7, the second battery charger 200 may comprise a charger output port 214 for electrically coupling a rechargeable battery to the second battery charger 200. According to the embodiment shown, the charger output port 214 may comprise an electrical socket comprising an insulating material and implemented with two male terminals for receiving a female electrical connector (not labeled) of a rechargeable battery. The charger output port 214 may be further implemented with a sensor device 309, which may be an RFID reader, and which may be disposed along an inner surface of the electrical socket of charger output port 214. The second battery charger 200 may be configured to provide a charging current to a rechargeable battery through the charger output port 214 upon user initiation of charging operation while the rechargeable battery is electrically connected to the charger output port 214.

According to embodiment shown in FIG. 6, the second battery charger 200 may comprise two switches: a first switch 202 and a second switch 204. Both switches 202, 204 may receive user input to set one or more charging parameters of the second battery charger 200 and/or initiate deliver of a charging current by the second battery charger 200. As shown in FIG. 6, each switch may comprise a push button. In alternative embodiments, the switches may comprise any combination of push buttons, toggle switches, radial switches, and the like.

As shown in FIG. 6, the first switch 202 of the second battery charger 200 may be a push-button switch providing the user "start/stop" control over the delivery of a charging current by the second battery charger 200. The first switch 202 may also be configured to operate as a status indicator, illuminating to indicate a status or condition of the second battery charger 200.

The first switch 202 of the second battery charger 200 may have substantially similar construction and features as the corresponding first switch 102 of the first battery charger 100, described above. Further, the first switch 202 of the second battery charger 200 may perform substantially the same functions as the corresponding first switch 102 of the first battery charger 100, described above. As such, specific features of the first switch 202 will not be described herein, but are instead, described through reference to the description of the first switch 102, above. The convention of describing the first switch 102 in this manner is adopted for the purpose of avoiding unnecessary and repetitive language, only, and shall not foreclose from the scope of this disclosure a wide range of variations, modifications, changes and substitutions expressly, or implicitly, disclosed here.

As shown in FIG. 6, the second battery charger 200 may be implemented with a second switch 204 which may be a push button switch for allowing the user to select a "Charge Rate." The second switch 204 of the second battery charger 200 may have substantially similar construction and features as the corresponding second switch 104 of the first battery charger 100, described above. Further, the second switch 204 of the second battery charger 200 may perform substantially the same functions as the corresponding second switch 104 of the first battery charger 100, described above. As such, specific features of the second switch 204 will not be described herein, but are instead, described through reference to the description of the second switch 104, above. The convention of describing the second switch 204 in this manner is adopted for the purpose of avoiding unnecessary and repetitive language, only, and shall not foreclose from the scope of this disclosure a wide range of variations, modifications, changes and substitutions expressly, or implicitly, disclosed here.

As shown in FIG. 6, the second battery charger 200 may be implemented with one or more indicators 218 and 220. The indicators 218 and 220, which may be one or more LEDs, may be configured to indicate the Charge Status, the selected Charge Rate, and the Charge Progress. In alternative embodiments, the indicators 218 and 220 may be configured to indicate additional, fewer, or different statuses of the battery charger.

As shown in FIG. 6, the second battery charger 200 may be implemented with a charger output port 214 for electrically coupling a rechargeable battery to the second battery charger 200. In an embodiment, the charger output port 214 may be an electrical connector such as an electrical socket or receptacle for receiving an electrical plug coupled to a battery to be charged, for example. According to the embodiment shown, the charger output port 214 may comprise an electrical socket comprising an insulating material and implemented with two male terminals 222A and 222B for receiving a female electrical connector 152 of a rechargeable battery 150. In an embodiment, the charger output port 214 may be provided with balancing terminals 224A and 224B, which connect to LIPO Balancing Circuit 312, as shown in FIG. 9. The balancing terminals may not be utilized when charging other than LiPo batteries.

The indicators 218 and 220 of the second battery charger 200 may have substantially similar construction and features as the corresponding indicators 118 and 120, respectively, of the first battery charger 100, described above. Further, the indicators 218 and 220 of the second battery charger 200 may perform substantially the same functions as the corresponding indicators 118 and 120, respectively, of the first battery charger 100, described above. As such, specific features of the indicators 218 and 220 will not be described herein, but are instead, described through reference to the description of the indicators 118 and 120, respectively, above. The convention of describing the indicators 218 and 220 in this manner is adopted for the purpose of avoiding unnecessary and repetitive language, only, and shall not foreclose from the scope of this disclosure a wide range of variations, modifications, changes and substitutions expressly, or implicitly, disclosed here.

The second battery charger 200 may be provided with an internal component configuration similar to that shown in FIG. 9, excepting the balancing circuit 312 shown. The second battery charger 200 may comprise a charging circuit 306, power supply circuitry 302, a processor 318, a memory 316, an I/O interface 310, and a fan 314. The second battery charger 200 may additionally comprise an RFID sensor 309. Each of these components may have substantially similar functions, features, and characteristics as described above, in reference to the first battery charger 100.

An embodiment of the second battery charger 200, as described herein, may be implemented with a method of operation similar to that shown in FIG. 10 and described in reference to the first battery charger 100, with the steps associated to LiPo battery charging omitted. Further, it should be appreciated that an embodiment of the second battery charger 200, as described herein, implemented with a method of operation similar to that shown in FIG. 10 may operate to perform the respective battery charger operations described in reference to FIGS. 16 and 17, above.

The Third Battery Charger 400

Referring to FIGS. 24-27, a third embodiment of a battery charger, the third battery charger 400, is shown. The third battery charger 400 may be a multiple battery charger comprising a component configuration including at least two component groups for generating one or more configurable charge currents. Each component group may be operable to generate one or more configurable charge currents and may be implemented with one or more components for electrically coupling to a rechargeable battery. In an embodiment, each component group may be independently operable to charge one or more batteries. Additionally, or alternatively, two or more component groups may be operated in concert to charge one or more batteries.

In an embodiment, each component group of the third battery charger 400 may comprise a charger output port for coupling with a battery to be charged, a sensor device and reader for receiving information from the battery to be charged, one or more balance ports for balance charging, a plurality of switches for receiving user input, and a plurality of status indicators. In alternative embodiments, one or more component groups comprising the third battery charger 400 may be provided with additional, fewer, or different components.

Each component group may comprise substantially similar features, components, and characteristics as the first battery charger 100, as described above, and may be operable to perform some, or all, of the functions of the first battery charger 100. For example, each component group of the third battery charger 400 may comprise a single battery charger which may accommodate rechargeable batteries of different chemistries, such as accommodating both Li-type and Ni-type batteries. Further, each component group of the third battery charger 400 may comprise a single battery charger configured to implement charge parameter settings received from a coupled battery to be charged. Each component group of the third battery charger 400 may comprise a single battery charger configured to implement default charge parameter settings in response to detected conditions. Each component group of the third battery charger 400 may comprise a single battery charger which may receive user input for adjusting and/or entering one or more charge parameter settings.

The third battery charger 400 may be implemented with one or more features, and/or components allowing operation of the third battery charger 400 to perform one or more functions beyond those of the first battery charger 100. In an embodiment, the third battery charger 400 may be provided with one or more switches, indicators, and/or internal components in addition to, and different from, those of the first battery charger 100. In an embodiment, for example, the third battery charger 400 may comprise one or more switches for toggling between independent operation of two or more respective component groups and concerted operation of two or more respective component groups. The third battery charger 400 may be operable to simultaneously electrically couple to multiple batteries for independent, or simultaneous, charging of more than one battery. Further, the third battery charger 400 may be operable in accordance with one or more power settings to selectively generate one or more high power charge currents.

Figure 25:
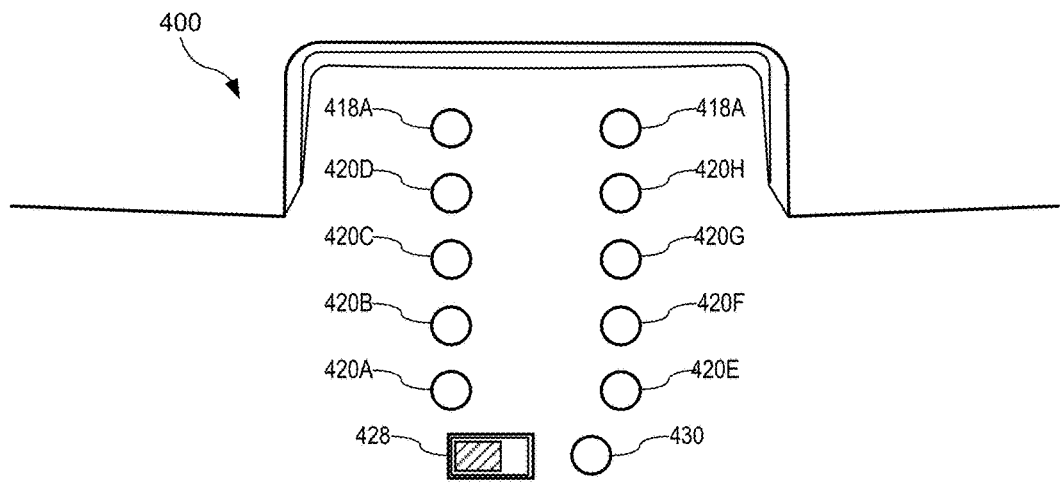
FIG. 25 is a detail view showing the status indicators of the third battery charger 400.
Figure 26:
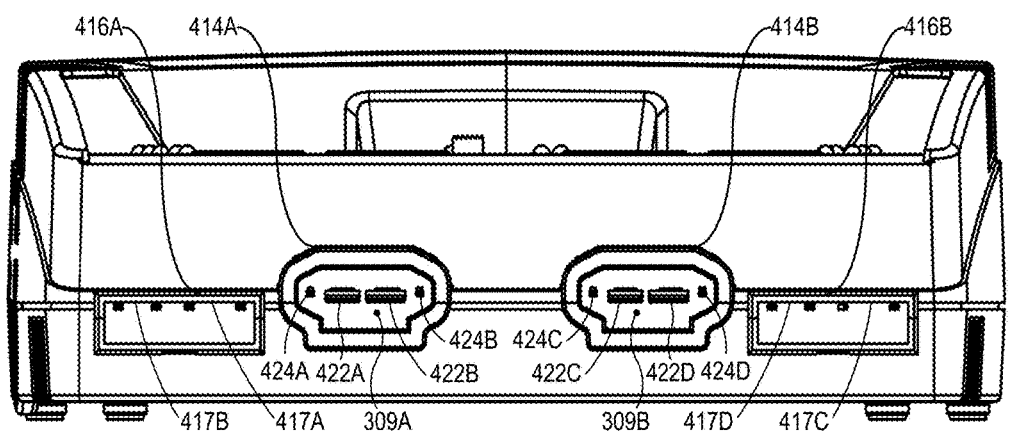
FIG. 26 is a front view of the third battery charger 400.
Figure 27:
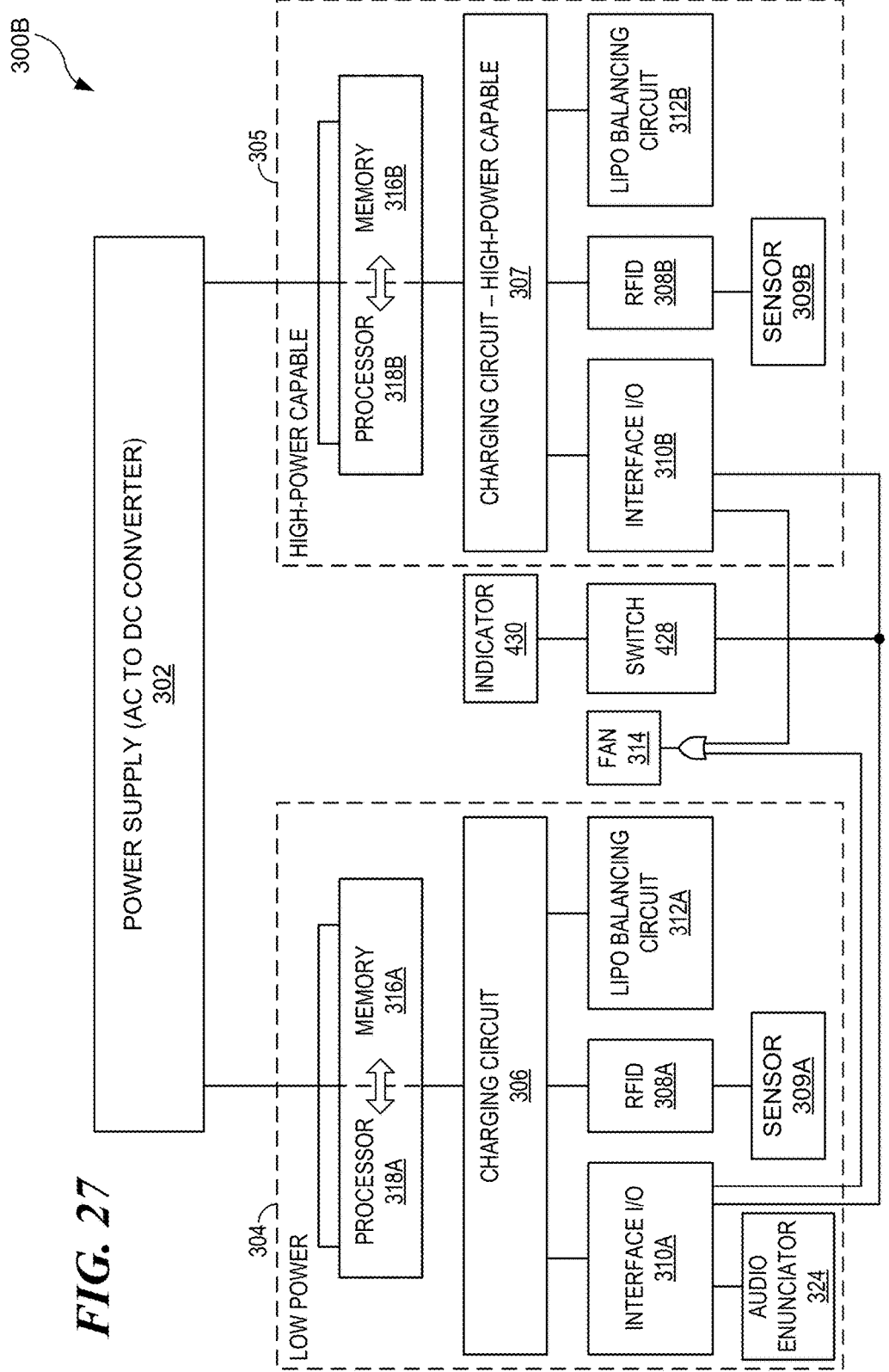
FIG. 27 is a block diagram of an embodiment of a component configuration 300B of the third battery charger 400.

According to the particular embodiment shown in FIGS. 24-27, the third battery charger 400 may comprise two component groups for generating one or more configurable charge currents for charging one or more batteries. A first component group may comprise a low power section of the third battery charger 400. According to the embodiment shown, the low power section may comprise a first switch 402A, a second switch 404A, a third switch 408A, a fourth switch 412A, a charge output port 414A, a balance port 416A, an indicator 418A, and a plurality of indicators 420A-D. As shown in FIG. 27, the low power section 304 may additionally comprise an RFID 308A, a sensor 309A, an interface I/O 310A, a LiPo balancing circuit 312A, a charging circuit 306, a processor 318A, a memory 316A, and an audio enunciator 324. The low power section components may be operable to generate one or more configurable charge currents within a first range of Charge Rates which may comprise one or more lower amperage Charge Rates. In an embodiment, the low power section may comprise additional, fewer, or different components than those shown in the embodiment of FIGS. 24-27.

A second component group of the third battery charger 400 may comprise a high power section of the third battery charger 400. The high power section may include a first switch 402B, a second switch 404B, a third switch 408B, a fourth switch 412B, a charger output port 414B, a balance port 416B, an indicator 418B, and a plurality of indicators 420E-H. As shown in FIG. 27, the high power section 305 may additionally comprise an RFID 308B, a sensor 309B, an interface I/O 310B, a LiPo balancing circuit 312B, a charging circuit 307, a processor 318B, a memory 316B. The high power section components may be operable to generate one or more configurable charge currents within either the first range of Charge Rates or a second range of Charge Rates. In an embodiment, the second range of Charge Rates may comprise one or more higher amperage Charge Rates. In an embodiment, the high power section may comprise additional, fewer, or different components than those shown in the embodiment of FIGS. 24-27.

The third battery charger 400, according to the embodiment shown, may additionally comprise a power supply 302, a fan 314, a plug 426, a fifth switch 428, and an indicator 430. These additional components may each electrically couple with one or more low power section components as well as one or more high power section components, respectively, via one or more wired or wireless connections. In alternative embodiments, the third battery charger 400 may comprise additional, fewer, or different components than those shown in the embodiment of FIGS. 24-27.

Figure 24:
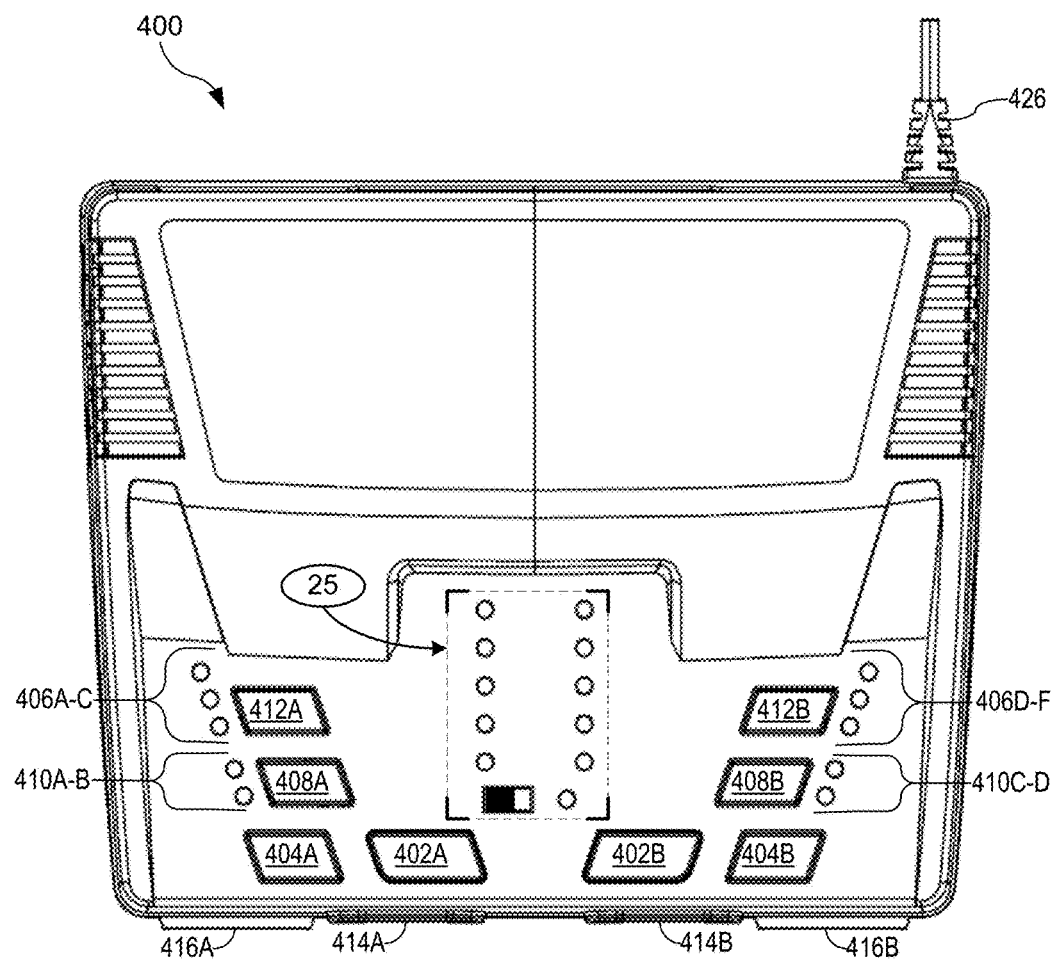
FIG. 24 is a top-down view of an embodiment of a third battery charger 400.

As shown in FIGS. 24 and 26, the third battery charger 400 may include the charger output ports 414A, B for electrically coupling rechargeable battery to the third battery charger 400. The charger output ports 414A, B may be male connectors, each having substantially the same features, functions, and characteristics as the charger output port 114 of the first battery charger 100, respectively. The respective charger output ports 414A, B may each receive a male connector of a battery to be charged to electrically couple the battery with the third battery charger 400. One or more charge currents may be applied to the battery, or batteries, to be charged by the third battery charger 400 via the respective charger output ports 414A, B. The third battery charger 400 may be configured to provide one or more charge currents to one or more rechargeable batteries via the charger output ports 414A, B upon user initiation of charging operation. As shown in FIG. 26, the charger output ports 414A, B may each be implemented with male terminals 422, balancing terminals 424, and a sensing device 309. In an embodiment, the charger output ports 414A, B may comprise additional, fewer, or different components than those shown in FIGS. 24 and 26.

The charger output port 414A may electrically couple a battery, via a wired or wireless connection, to one or more of the low power section components to charge the battery when the male connector of the battery is received by the charger output port 414A. The charger output port 414A may comprise an electrical socket comprising an insulating material and may be implemented with the male terminals 422A, B. The male terminals 422A, B may comprise substantially the same features, functions, and characteristics as the male terminals 122A, B of the first battery charger 100, respectively. In an embodiment, the charger output port 414A may, additionally, be implemented with the balancing terminals 424A, B for directly or indirectly electrically coupling a battery coupled to the output charger port 414A, and implemented with corresponding balance terminal ports, to the balancing circuit 312A. The balancing terminals 424A, B may comprise substantially the same features, functions, and characteristics as the balancing terminals 124A, B, respectively, of the first battery charger 100.

The charger output port 414B may electrically couple a battery, via a wired or wireless connection, to one or more of the high power section components to charge the battery when the male connector of the battery is received by the charger output port 414B. The charger output port 414B may comprise an electrical socket comprising an insulating material and may be implemented with the male terminals 422C, D. The male terminals 422C, D may comprise substantially the same features, functions, and characteristics as the male terminals 122A, B, respectively, of the first battery charger 100. The charger output port 114B may, additionally, be implemented with the balancing terminals 424C, D for directly or indirectly electrically coupling a battery coupled to the output charger port 414B, and implemented with corresponding balance terminal ports, to the balancing circuit 312B. The balancing terminals 424C, D may comprise substantially the same features, functions, and characteristics as the balancing terminals 124A, B, respectively, of the first battery charger 100.

The charger output ports 414A, B may be implemented with the sensor devices 309A, B, respectively, for receiving and transmitting data to the one or more batteries coupled to the third battery charger 400. The sensor device 309A, B may couple to a respective RFID reader 308A, B (shown in FIG. 27) for receiving data from, and transmitting data to, the respective RFID reader 308A, B. In an embodiment, the sensor devices 309A, B and the RFID readers 308A, B may, respectively, comprise single components within the respective component groups of the third battery charger 400. In an embodiment, the sensor devices 309A, B may comprise antennae coupled to the respective RFID readers 308A, B.

In an embodiment, the third battery charger 400 may be configured to be compatible with only batteries of one or more specific chemistry types. In an embodiment, the sockets of the respective output charge ports 414A, B may be implemented with one or more keying features for preventing incompatible batteries from electrically coupling to the output charge ports 414A, B, respectively in accordance with the description provided, above, and in referent to the output charge port 114 of the first battery charger 100. Alternatively, the output charge ports 414A, B of the third battery charger 400 may not be implemented with the keying features described above.

In an embodiment, the third battery charger 400 may be configured to electrically couple with the battery 150 which may comprise the female connector 152. In an embodiment, the female connector 152 may comprise some, or all, of the features, functions, and characteristics of the respective female connectors 152A-C shown in FIGS. 18-20. The third battery charger 400 may be configured to electrically couple with batteries having a female connector further comprising the RFID tag 2206 in the manner described, above, in reference to the first battery charger 100. Specifically, when an RFID equipped battery is coupled to the third battery charger 400, the RFID tag 2206 and respective RFID reader 308A, B and/or sensing device 309A, B may establish an RF connection and start to communicate and transmit information to the respective RFID reader 308A, B and/or sensing device 309A, B. Information contained on the RFID tag 2206 may comprise a manufacturer assigned identifier number, or code, unique to the specific battery model, or unique to the battery, itself. Additionally, in alternative embodiments, further information such as chemistry type, cell count, recommended charge rates, number of charges on the battery, among other information, may be contained on the RFID tag 2206 and read by the respective RFID reader 308A, B and/or sensing device 309A, B. The third battery charger 400 may use the information received to configure the charge current and charge operation of the battery charger 400, allowing for single push-button charging of batteries having a recognized RFID tag 2206.

Additionally, or alternatively, the third battery charger 400 may be configured to accommodate electrical coupling with a battery comprising a female connector not implemented with an RFID tag 2206. In an embodiment, the third battery charger 400 may respond to being electrically connected to a battery comprising, or not comprising, the RFID tag 2206 in a manner consistent with that described above, in reference the first battery charger 100.

As shown in FIGS. 24 and 26, the third battery charger 400 may be implemented with the balance connector ports 416A, B for electrically coupling the third battery charger 400 with the respective balance connectors of one or more batteries to be charged by the third battery charger 400. In an embodiment, the third battery charger 400 may be configured to receive both a female electrical connector and a balance connector of the battery to be charged when balance charging a LiPo battery. The balance connector ports 416A, B may have substantially similar functions, features, and characteristics as the balance connector ports 116A, B of the first battery charger 100, described above.

The respective balance connector ports 416A, B may comprise one or more connectors 417 for directly or indirectly electrically coupling batteries of different sizes, or capacities, to a balancing circuit 312 within the third battery charger 400. As shown, the balance connector port 416A may comprise the connectors 417A, B for directly or indirectly electrically coupling a battery to the balancing circuit 312A. In an embodiment, for example the connector 417A may be sized to electrically couple with a 3S-size battery while the connector 417B may be sized to electrically couple with a 2S-size battery. The balance connector port 416B may comprise the connectors 417C, D for electrically coupling a battery to the balancing circuit 312B. The connector 417C may be sized to electrically couple with a 3S-size battery while the connector 417D may be sized to electrically couple with a 2S-size battery. In alternative embodiments, the balance connector ports 416A, B may comprise additional, fewer, or differently sized connectors 417 than those of the embodiment shown in FIG. 26.

In an embodiment, the third battery charger 400 may be implemented with logic for adjusting one or more charger parameter settings, such as the Battery Type, the Charge Mode, or the Charge Rate, in response to sensing a battery directly or indirectly electrically connected to a balancing circuit 312. For example, the third battery charger 400 implemented with a Battery Type selector may be configured to set the Battery Type to a default setting in response to sensing a battery electrically connected to a connector 417. Further, the third battery charger 400 implemented with a Charge Type selector may be configured to set the Charge Type to "Balance" in response to sensing a battery electrically connected to a connector 417. The third battery charger 400 implemented with a Charge Rate selector may be configured to set the Charge Rate to a pre-determined value in response to sensing a battery electrically connected to a connector 417.

Referring to FIGS. 24 and 26, in an embodiment, the third battery charger 400 may comprise a plurality of controls components for receiving input from a user of the third battery charger 400, including at least: the first switch 402A, B; the second switch 404A, B; the third switch 408A, B; the fourth switch 412A, B; and, the fifth switch 428. The respective switch positions may comprise user input for configuring one or more parameters of one or more charge currents generated by one or both of the low power section 304 and/or high power sections 305 of the third battery charger 400.

In an embodiment, the third battery charger 400 may be implemented with additional or fewer switches or, alternatively, may be implemented with one or more switches incorporated into a touch screen display for receiving input from a user. Further, in an embodiment, the low power and high power sections of the third battery charger 400 may be implemented with switch configurations differing from one another. According to the embodiment shown, the switches 402, 404, 408, 412 may each comprise a push button for toggling between one or more, respective, parameter selections. In alternative embodiments, the switches 402, 404, 408, 412 may comprise any combination of push buttons, toggle switches, radial switches, and the like for toggling between one or more, respective, parameter selections.

Referring to FIG. 24, the respective first switches 402A, B may be push button switches providing the user "start/stop" control over the generation and/or transmission of one or more charge currents by the respective low power and high power sections of the third battery charger 400. Specifically, the first switch 402A may provide "start/stop" control over the low power section components while the first switch 402B may provide "start/stop" control over the high power section components. The respective first switches 402A, B may also operate as status indicators, illuminating to indicate a status or condition of the respective low and/or high power sections of the third battery charger 400.

The first switches 402A, B of the third battery charger 400 may have substantially similar construction and features as the first switch 102 of the first battery charger 100, described above. Further, the first switch 402A of the third battery charger 400 may perform substantially the same functions for controlling operation of the low power section of the third battery charger 400 as those of the first switch 102 of the first battery charger 100, such as allowing for "unlocking" of the low power section for configuring operation of the low power section in "Advanced Mode," for example. Similarly, the first switch 402B of the third battery charger 400 may perform substantially the same functions for controlling operation of the high power section of the third battery charger 400 as those of the first switch 102 of the first battery charger 100, such as allowing for "unlocking" of the high power section for configuring operation of the high power section in "Advanced Mode," for example. Therefore, the specific features of the first switches 402A, B are presented through reference to the description of the features, functions, and characteristics of the first switch 102, provided above. The convention of describing the first switches 402A, B in this manner is adopted for the purpose of avoiding unnecessary and repetitive language, only, and shall not foreclose from the scope of this disclosure a wide range of variations, modifications, changes and substitutions expressly, or implicitly, disclosed here.

The third battery charger 400 may be implemented with the second switches 404A, B which may be push buttons for allowing user selection of a Charge Rate of the one or more charge currents generated by the respective low power and high power sections of the third battery charger 400. Specifically, the second switch 404A may allow user selection of a Charge Rate configuring the one or more charge currents generated by the low power section components while the second switch 404B may allow user selection of a Charge Rate configuring the one or more charge currents generated by the high power section components.

In an embodiment, the low power section may be configured with four Charge Rates, which may comprise one or more selectable amperage values. For example, the Charge Rates of the low power section may include: 1A; 2A; 3A; and, 4A settings. In an embodiment, the high power section may be configured with one or more separate sets of selectable Charge Rates, with each set comprise one or more selectable amperage values. The first set of Charge Rates for of the high power section may include: 1A; 2A; 3A; and, 4A settings. The second set of Charge Rates corresponding to the high power section may comprise of one or more selectable amperage values which may be greater than the Charge Rates comprising the first set. In an embodiment, for example, the second set of Charge Rates corresponding to the high power section may include: 5A; 6A; 7A; and, 8A settings. The high power section may be described as operating at High Power when configured for charging operation using one or more charge currents generated by the high power section and with a Charge Rate from the second set of Charge Rates for the high power section selected. In alternative embodiments, the third battery charger 400 may be implemented with additional, or fewer, Charge Rates with larger, or smaller, steps between amperage value settings. In further alternative embodiments, the Charge Rates may be selected from one or more continuous ranges of amperage value settings.

In an embodiment, the second switches 404A, B of the third battery charger 400 may have substantially similar construction and features as the second switch 104 of the first battery charger 100, described above. Further, the second switch 404A of the third battery charger 400 may perform substantially similar functions for configuring operation of the low power section of the third battery charger 400 as those of the second switch 104 of the first battery charger 100, such as allowing for "unlocking" of the low power section for configuring operation of the low power section in "Advanced Mode," for example. Similarly, the second switch 404B of the third battery charger 400 may perform substantially similar functions for configuring operation of the high power section of the third battery charger 400 as those of the second switch 104 of the first battery charger 100, such as allowing for "unlocking" of the high power section for configuring operation of the high power section in "Advanced Mode," for example. Therefore, the specific features of the second switches 404A, B are presented through reference to the description of the features, functions, and characteristics of the second switch 104, provided above. The convention of describing the second switches 404A, B in this manner is adopted for the purpose of avoiding unnecessary and repetitive language, only, and shall not foreclose from the scope of this disclosure a wide range of variations, modifications, changes and substitutions expressly, or implicitly, disclosed here.

The third battery charger 400 may be implemented with the third switches 408A, B which may be push buttons for allowing user selection of a Battery Type setting for the one or more charge currents generated by the respective low power and high power sections of the third battery charger 400. Specifically, the third switch 408A may allow user selection of a Battery Type setting configuring the one or more charge currents generated by the low power section components while the third switch 408B may allow user selection of a Battery Type setting configuring the one or more charge currents generated by the high power section components.

In an embodiment, the third switches 408A, B of the third battery charger 400 may have substantially similar construction and features as the third switch 108 of the first battery charger 100, described above. Further, the third switch 408A of the third battery charger 400 may perform substantially similar functions for configuring operation of the low power section of the third battery charger 400 as those of the third switch 108 of the first battery charger 100, as described above. Similarly, the third switch 408B of the third battery charger 400 may perform substantially similar functions for configuring operation of the high power section of the third battery charger 400 as those of the third switch 108 of the first battery charger 100, as described above. Therefore, the specific features of the third switches 408A, B are presented through reference to the description of the features, functions, and characteristics of the third switch 108, provided above. The convention of describing the third switches 408A, B in this manner is adopted for the purpose of avoiding unnecessary and repetitive language, only, and shall not foreclose from the scope of this disclosure a wide range of variations, modifications, changes and substitutions expressly, or implicitly, disclosed here.

The third battery charger 400 may include one or more indicator devices for communicating one or more current statuses, or parameter settings, or configurations corresponding to one or both of the low power and high power sections. In an embodiment, the indicator devices may be any combination of devices for generating visual or auditory signals perceivable by a user of the third battery charger 400. For example, in an embodiment, the third battery charger 400 may be implemented with any combination of lights, speakers, displays, and the like for communicating information to a user.

As shown in FIGS. 24 and 25, the third battery charger 400 may be implemented with one or more sets of Battery Type selection indicators 410A, B and 410C, D. The Battery Type selection indicators 410A, B and 410C, D may be LEDs which may illuminate to indicate the current Battery Type selections of the respective low power and high power sections. The third battery charger 400 may be configured to illuminate the LED corresponding to the currently selected Battery Type for the respective low power and high power sections. In an alternative embodiment, additional, fewer, or no Battery Type selection indicators 410A, B and 410C, D may be provided. For example, in an embodiment utilizing a radial switch for Battery Type selection, no Battery Type selection indicators may be provided. In another embodiment, the low power and high power sections may each be implemented with a single indicator 410 configured to illuminate a different color corresponding to each of the possible Battery Types of the respective sections.

The third battery charger 400 may include the fourth switches 412A, B which may be push buttons for allowing user selection of a Charge Mode setting for the one or more charge currents generated by the respective low power and high power sections of the third battery charger 400. Specifically, the fourth switch 412A may allow user selection of a Charge Mode setting configuring the one or more charge currents generated by the low power section components while the fourth switch 412B may allow user selection of a Charge Mode setting configuring the one or more charge currents generated by the high power section components.

In an embodiment, the fourth switches 412A, B of the third battery charger 400 may have substantially similar construction and features as the fourth switch 112 of the first battery charger 100, described above. Further, the fourth switch 412A of the third battery charger 400 may perform substantially similar functions for configuring operation of the low power section of the third battery charger 400 as those of the fourth switch 112 of the first battery charger 100, as described above. Similarly, the fourth switch 412B of the third battery charger 400 may perform substantially similar functions for configuring operation of the high power section of the third battery charger 400 as those of the fourth switch 112 of the first battery charger 100, as described above. Therefore, the specific features of the fourth switches 412A, B are presented through reference to the description of the features, functions, and characteristics of the fourth switch 112, provided above. The convention of describing the fourth switches 412A, B in this manner is adopted for the purpose of avoiding unnecessary and repetitive language, only, and shall not foreclose from the scope of this disclosure a wide range of variations, modifications, changes and substitutions expressly, or implicitly, disclosed here.

As shown in FIGS. 24 and 25, the third battery charger 400 may be implemented with one or more sets of Charge Mode selection indicators 406A-C and 406D-F. In an embodiment, the Charge Mode selection indicators 406A-C and 406D-F may be LEDs which may illuminate to indicate the currently selected Charge Mode for the respective low power and high power sections. The Charge Mode selection indicators 406A-C may pair with the fourth switch 418A, indicating the current Charge Mode selection for the low power section of the third battery charger 400. The Charge Mode selection indicators 406D-F may pair with the fourth switch 418B, indicating the current Charge Mode selection for the high power section of the third battery charger 400.

In an alternative embodiment, additional, fewer, or no Charge Mode selection indicators 406 may be provided. For example, in an embodiment utilizing a radial switch for Charge Mode selection, no Charge Mode selection indicators may be provided. In another embodiment, a single indicator 406 may be provided for each of the respective low power and high power sections, with the indicators 406 each configured to illuminate a different color corresponding to the different selectable Charge Modes.

As shown in FIGS. 24 and 25, the third battery charger 400 may be implemented with one or more sets of the indicators 418 and 420. In an embodiment, the sets of the indicators 418, 420 may each comprise one or more LEDs configured to illuminate for indicating one or more of the Charge Status, the selected Charge Rate, and the Charge Progress.

In an embodiment, the indicators 418A, B of the third battery charger 400 may have substantially similar construction and features as the indicator 118 of the first battery charger 100, described above. Further, the indicator 418A of the third battery charger 400 may perform substantially similar functions for indicating a status or parameter setting of the low power section of the third battery charger 400 as those of the indicator 118 of the first battery charger 100, as described above. Similarly, the indicator 418B of the third battery charger 400 may perform substantially similar functions for indicating a status or parameter setting of the high power section of the third battery charger 400 as those of the indicator 118 of the first battery charger 100, as described above. Therefore, the specific features of the indicators 418A, B are presented through reference to the description of the features, functions, and characteristics of the indicator 118, provided above. The convention of describing the indicators 418A, B in this manner is adopted for the purpose of avoiding unnecessary and repetitive language, only, and shall not foreclose from the scope of this disclosure a wide range of variations, modifications, changes and substitutions expressly, or implicitly, disclosed here.

Similarly, in an embodiment, the indicators 420A-H of the third battery charger 400 may have substantially similar construction and features as the indicator 120 of the first battery charger 100, described above. Further, the indicators 420A-D of the third battery charger 400 may perform substantially similar functions for indicating a status or parameter setting of the low power section of the third battery charger 400 as those of the indicator 120 of the first battery charger 100, as described above. Similarly, the indicators 420E-H of the third battery charger 400 may perform substantially similar functions for indicating a status or parameter setting of the high power section of the third battery charger 400 as those of the indicator 120 of the first battery charger 100, as described above. Therefore, the specific features of the indicators 420A-H are presented through reference to the description of the features, functions, and characteristics of the indicator 120, provided above. The convention of describing the indicators 420A-H in this manner is adopted for the purpose of avoiding unnecessary and repetitive language, only, and shall not foreclose from the scope of this disclosure a wide range of variations, modifications, changes and substitutions expressly, or implicitly, disclosed here.

The third battery charger 400 may be implemented with logic for displaying error codes to a user through illumination of one or more of the indicators 418, 420, 406, and/or 410, as appropriate, according to defined modes. The error codes may be displayed by flashing or blinking the indicators, for example. Referring to Table 1, above, several examples of error codes and illumination modes are shown. Specifics regarding detection and effects of each error code are omitted inasmuch as such details are not considered necessary to obtain a complete understanding of the present invention, and are considered to be within the understanding of persons of ordinary skill in the relevant art. The listing in Table 1 is illustrative, only. In an embodiment, additional, fewer, or different error codes and illumination modes may be provided.

As shown in FIGS. 25 and 27, in an embodiment, the third battery charger 400 may include the fifth switch 428 for selecting an "Output Mode" of the third battery charger 400 by a user. In an embodiment, the third battery charger 400 may be operable in accordance with two or more "Output Modes." According to the embodiment shown, a user may select an "Output Mode" by setting the switch 428 position to the position corresponding to the desired mode. The fifth switch 428 may comprise a toggle switch. In alternative embodiments, the fifth switch 428 may comprise a push button switch, a radial switch, or other similar switching device. In further alternative embodiments, the fifth switch 428 may not be provided as a separate input device of the third battery charger 400. In such further embodiments, the function, or functions, performed by the fifth switch 428 may be performed by one or more other input devices of the third battery charger 400, such as one or both of the second switches 404A, B, for example.

Referring to FIG. 27, the fifth switch 428 may electrically couple with one or more components comprising each of the respective low power 304 and high power sections 305, allowing for the position of the fifth switch 428 to be sensed or transmitted to at least one component comprising each of the respective low power 304 and high power sections 305. The fifth switch 428 may electrically couple with one or more low power 304 and/or high power section 305 components via one more wired or wireless connections. According to the embodiment shown, the fifth switch 428 may electrically couple with the respective Interface I/Os 310A, B via a direct, wired connection. The fifth switch 428 may also indirectly electrically couple, such as through an intermediary device, with additional components comprising each of the respective low power 304 and high power sections 305, such as the charging circuits 306, 307, the balancing circuits 312A, B, the processors 318A, B, and/or the memories 316A, B via one or more wired or wireless connections. In alternative embodiments, the fifth switch 428 may directly or indirectly couple with any combination of components comprising the respective low power 304 and high power sections 305.

One or more low power section and/or high power section components may be reconfigured in accordance with "Output Mode" selection. In an embodiment, one or more components of the low power and/or high power sections, respectively, may be enabled, disabled, or reconfigured in response to the "Output Mode" selected. According to the embodiment shown, the third battery charger 400 may be operable in either of two "Output Modes." In alternative embodiments, additional "Output Modes" may be provided. According to the embodiment shown, a first "Output Mode" may be provided, allowing for independent operation of the low power section and high power section. This mode may be referred to as "Dual Output Mode." While in "Dual Output Mode," each of the low power and high power sections may be enabled and operable to generate one or more charge currents for performing one or more charging operations.

While configured for "Dual Output Mode," the third battery charger 400 may be operable to charge a battery using either of the low power or high power sections. In an embodiment, operation of the high power section of third battery charger 400 at a Charge Rate corresponding to High Power operation may be prevented. In such an embodiment, the high power section of third battery charger 400 may be operable at lower Charge Rates, such as the Charge Rates comprising the first set, described above. Further, while configured for "Dual Output Mode" operation, the third battery charger 400 may be operable to generate charging currents for simultaneous charging more than one battery. According to the embodiment shown, for example, the low power section and the high power section of the third battery charger 400 may separately and simultaneously operated, with the low power section generating a first charge current for charging a first battery and the high power section generating a second charge current for charging a second battery.

According to the embodiment shown, a second "Output Mode" may be provided in which only the high power section of the third battery charger 400 is operable to generate one or more charge currents for charging a battery while the low power section is not operable to generate one or more charge currents for charging a battery. This second mode may be referred to as High Output mode. While in High Output mode, the third battery charger 400 may be operable to charge a battery using only the high power section and, further, may be operable to generate one or more charge currents according to High Power operation of the high power section. During High Output Mode operation, one or more components or functions of the low power section may be disabled or unperformed. In High Output mode, the third battery charger 400 may be operable to charge only a single battery. Advantageously, the charging time required to perform a battery charging operation may be reduced by operation of the third battery charger 400 in High Output mode through application of one or more High Power charge currents to the battery to be charged.

As shown in FIGS. 24 and 25, the third battery charger 400 may include the indicator 430 for indicating the current Output Mode selected using the fifth switch 428. In an embodiment, the Output Mode selection indicator 430 may comprise an LED. In alternative embodiments, the Output Mode selection indicator 430 may be any type of light, speaker, or visual display, or the like which may be suitable for communicating information to a user.

In embodiments in which a single Output Mode selection indicator 430 LED is provided, the Output Mode selection indicator 430 may be configured to illuminate only at times when a particular Output Mode is selected, such as only when the third battery charger 400 is in High Output mode. Alternatively, according to such an embodiment, the Output Mode selection indicator 430 may be configured with more than one illuminated color, with each respective Output Mode indicated via illumination of the Output Mode selection indicator 430 according to a specific color.

In alternative embodiments, additional Output Mode selection indicators 430 may be provided, whereby the current Output Mode may be indicated via illumination of less than all, or only one, of the Output Mode selection indicators 430. In further alternative embodiments, no Output Mode selection indicator 430 may be provided. In such embodiments, the function, or functions of the Output Mode selection indicator 430 described may be performed by one or more other components of the third battery charger 400, such as one or more of the indicators 418, for example.

Referring to FIGS. 24 and 27, the third battery charger 400 may include the plug 426 for electrically coupling the third battery charger 400 to an external power supply. In the embodiment shown, the plug 426 may comprise a standard A/C plug for insertion into a wall outlet. In an embodiment, the plug 426 may electrically couple the power supply 302 with the external power supply, powering the third battery charger 400 components, via one or more direct or indirect electrical couplings.

Turning now to FIG. 27, a block diagram of an internal component configuration 300B is shown. As shown, the internal component configuration 300B may comprise a power supply circuitry 302, the low power section 304 components, the high power section 305 components, and a fan 314. The low power section 304 may comprise the charging circuit 306, the RFID 308A, the sensor 309A, the interface I/O 310A, the balancing circuit 312A, the memory 316A, the processor 318A, and the audio enunciator 324. The high power section 305 may comprise the charging circuit 307, the RFID 308B, the sensor 309B, the interface I/O 310B, the balancing circuit 312B, the memory 316B, the processor 318B, and the audio enunciator 324. In an embodiment, the third battery charger 400 may be provided with an internal component configuration similar to the configuration 300B shown. The fifth switch 428 and the indicator 430 are also included in the configuration 300B for the purpose of illustrating one means by which the fifth switch 428 and the indicator 430 may be electrically connected to one or more components of the respective low power section 304 and the high power section 305.

In alternative embodiments, additional, fewer, or different components than shown in FIG. 27 may be provided. Additionally, or alternatively, in alternative embodiments, two or more components, such as the memory 316A and the processor 318A, for example, may be included within a single component, such as a controller. In an embodiment, the internal components of the third battery charger 400 may directly or indirectly, such as through an intermediary device, electrically couple to one another as shown in FIG. 27. Alternatively, in an embodiment, the internal components of the third battery charger 400 may electrically couple to one another according to any combination of direct, indirect, wired, and/or wireless couplings suitable for permitting the third battery charger 400 to perform the functions described, herein and above.

In an embodiment, when the third battery charger 400 is configured for operation in Dual Output mode, the respective internal components comprising the configuration 300B may have substantially the same features, functions, and characteristics as the corresponding internal components comprising the configuration 300A described above, respectively. Specifically, the power supply 302, the low power section 304 components, and the fan 314 of the configuration 300B of the third battery charger 400 may comprise substantially the same features, functions, and characteristics as the components comprising the configuration 300A of the first battery charger 100. Additionally, the power supply 302, the high power section 305 components, and the fan 314 of the configuration 300B of the third battery charger 400 may comprise substantially the same features, functions, and characteristics as the components comprising the configuration 300A of the first battery charger 100.

Conversely, in an embodiment, when the third battery charger 400 is configured for operation in High Output mode, one or more internal components comprising the configuration 300B may comprise one or more features, functions, and/or characteristics differing from the corresponding internal components comprising the configuration 300A described above, respectively. Specifically, one or more of the low power section 304 components may be disabled during High Output mode. The high power section 305 components, however, may continue to operate in a manner substantially consistent with features, functions, and characteristics of the corresponding components of first battery charger 100, as described above, when the third battery charger is in High Output mode, while generating one or more higher power charge currents.

During High Power operation, one or more of the components comprising the low power section 304, such as the charging circuit 306, the RFID 308A, the sensor 309A, and/or the balancing circuit 312A, may be disabled while the third battery charger is in High Output mode to prevent generation of one or more charge currents by the low power section. Additionally, or alternatively, one or more low power section 304 components may be implemented with logic commanding non-performance of one or more functions while the third battery charger is in High Output mode. For example, in an embodiment, the processor 318A may be implemented with logic commanding that any sensed data received via the sensor 309A from a battery coupled to one or more connection ports 414A, 416A be ignored during High Output mode operation. The processor 318A may, additionally or alternatively, command some or all of the indicators 406A-C, 410A, B, 418A, 420A-D to de-energized states while the third battery charger 400 is in High Output mode. Additionally, or alternatively, while in High Output mode, the power supply 302 may be configured to supply power to only the charging circuit 307. Alternatively, the power supply 302 may be configured to increase the power supplied to the charging circuit 307.

As shown in FIG. 27, in an embodiment, the configuration 300B may include the fan 314 for circulating air within the first battery charger 100 to cool the controls components 300B during battery charger 100 operation. The fan 314 may comprise any fan of any type or size comprising the prior art that may be suitable for use in a battery charger having the capabilities described in reference to the third battery charger 400.

Additionally, in an embodiment, the configuration 300B may include an audible enunciator 324, such as a speaker. The audible enunciator 324 may generate one or more sounds for alerting a user of one or more statuses of the third battery charger 400 in response to commands received from one or both processors 318A, B. For example, the audible enunciator 324 may make one or more tones, beeps, or the like, to indicate that a charging operation has started or completed, to indicate that an electrical coupling with a battery has been sensed, to indicate the detection of an error or malfunction, and the like. The audible enunciator 324 may be configured to produce one or more differing sounds comprising one or more differing tones, patterns, or durations for indicating statuses associated to each of the respective low power and high power sections operation. In an embodiment, the third battery charger may comprise a single audio enunciator 324. In such an embodiment, the processors 318A, B may be configured to communicate with one another to synchronize use of the audio enunciator 324 to avoid generation of overlapping sound indications.

Figure 28:
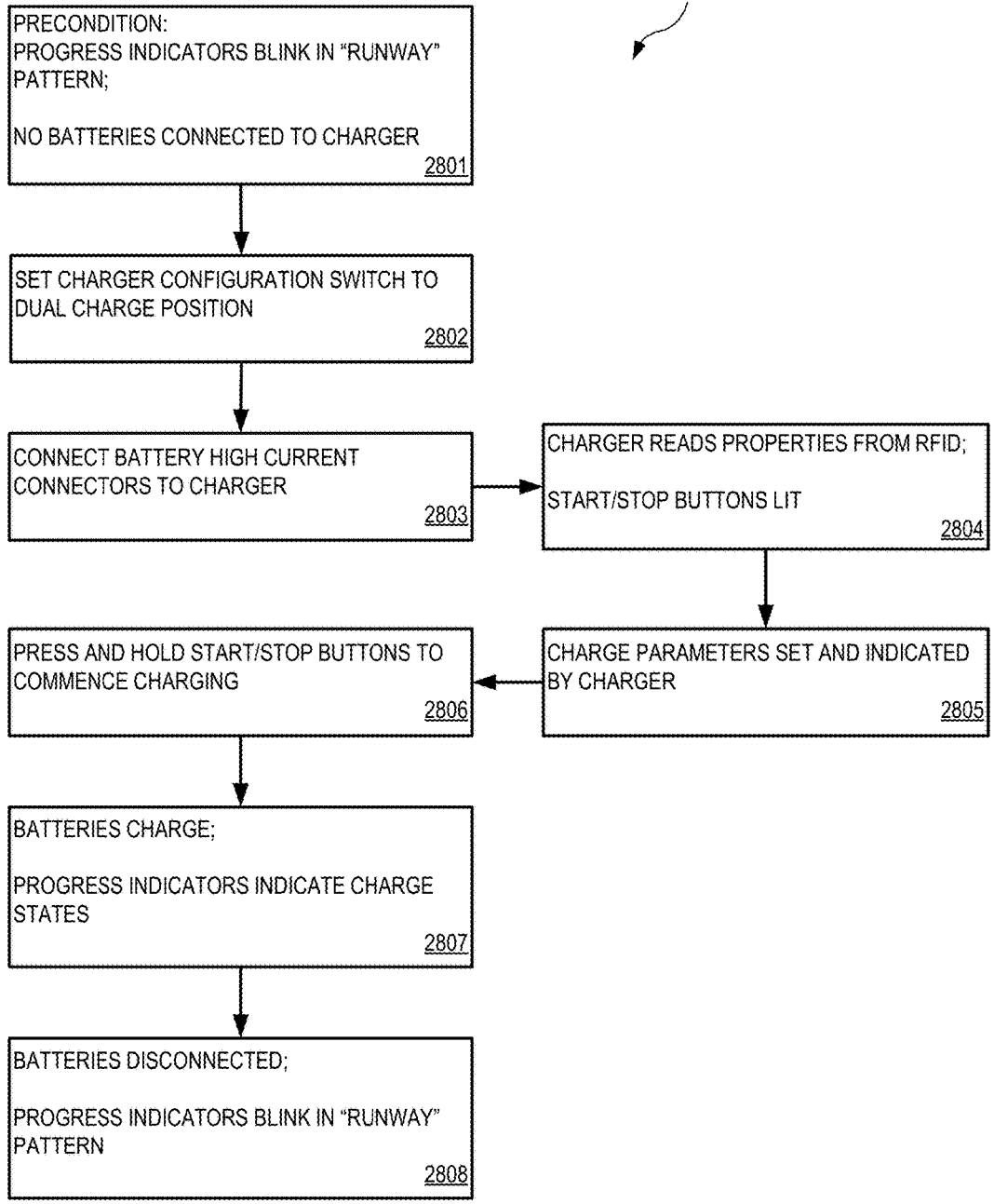
FIG. 28 is a flowchart illustrating a mode of operation of the third battery charger 400; and, FIG. 29 is a flowchart illustrating a mode of operation of the third battery charger 400.

An embodiment of the third battery charger 400, as described herein, may be implemented with the method 1000 of operation shown in FIG. 10 to perform the respective battery charger operations described, below, in reference to FIGS. 28 and 29.

When in Dual Output mode, the third battery charger 400 may be operated through implementation of the method 1000 in the manner described above and in reference to operation of the first battery charger 100 to perform one or more charging operations. The method 1000 may be executed once for operating the third battery charger 400 to initiate a single charging operation using one of the low power or high power section component groups. The method 1000 may be executed twice for operating the third battery charger 400 to initiate two separate charging operations using each of the respective low power or high power section component groups. A discussion of operation of the third battery charger 400 in Dual Output mode through application of the method 1000 is, thus, not repeated here. Similarly, when in High Output mode, the third battery charger 400 may be operated through implementation of the method 1000 in the manner described above and in reference to operation of the first battery charger 100 to perform a High Power charging operation using the high power section components. The method 1000 may be executed once for operating the third battery charger 400 to initiate a single High Power charging operation. A discussion of operation of the third battery charger 400 in High Output mode through application of the method 1000 is, thus, not repeated here.

Having described the features and capabilities of the third battery charger 400 according to the present invention, along with a method of operation for the third battery charger 400, illustrative examples of use of the third battery charger 400 are now provided. Referring to FIG. 28 a typical use of the third battery charger 400 in accordance with the method 1000 is shown. The FIG. 28 demonstrates an embodiment of operation of the third battery charger 400 to balance charge two "smart" 4 amp capacity LiPo type batteries implemented with RFID chips. The batteries are charged using charging parameters indicated by their respective RFID chips.

At Step 2801, the third battery charger 400 may be electrically connected to a power supply with neither battery coupled to the charger. The charger may be configured for High Output operation. Upon reception of power, the third battery charger 400 may illuminate the indicators 418B and 420E-H in a runway pattern, indicating that the third battery charger 400 is receiving power and is awaiting coupling of a battery to the high power section connector port 414B.

The user may reposition the fifth switch 428 to configure the third battery charger 400 for Dual Output operation at the Step 2802. Upon repositioning of the fifth switch 428, the indicators 418A and 420A-D as well as the indicators 418B and 420E-H may illuminate in a runway pattern. Each of the first and second batteries to be charged may be coupled to the third battery charger 400 at the step 2803 via the respective connector ports 114A, B.

At the Step 2804, the respective sensors 309A, B may sense the RFID tag of the first and second batteries, respectively. The respective "Start/Stop" buttons 402A, B may illuminate in response to the sensing of the RFID tags of the first and second batteries, indicating that the third battery charger 400 may receive information from the respective battery RFID tags for configuring the respective low and high power sections. The low and high power sections may set the battery charger operating parameters to the "LiPo," "Balance," and "4A" settings at Step 2805. The user may then commence charging of each battery, independently, by pressing and holding the respective "Start/Stop" buttons for 2 seconds at the Step 2806.

At Step 2807, each of the first and second batteries may charge while the Charge Status indicators 418A, B blinks to indicate that the respective charging operations are underway. Additionally, the Charge Rate/Progress indicators 420A-D and 420E-H may also illuminate to display the amount of charge contained by the respective batteries relative to the peak charge of the respective battery.

At Step 2808, the first and second charging processes may reach completion. Upon completion of charging of the first battery, the Charge Status indicator 418A may be cease blinking and illuminate solidly and the Charge Rate/Progress indicators 420A-D may turn off. Additionally, the audio enunciator 324 may generate a first sound signaling completion of the charge operation performed by the low power section. Upon completion of charging of the second battery, the Charge Status indicator 418B may be cease blinking and illuminate solidly and the Charge Rate/Progress indicators 420E-H may turn off. Additionally, the audio enunciator 324 may generate a second sound signaling completion of the charge operation performed by the high power section.

The third battery charger 400 may automatically begin "trickle charging" the first and second batteries, respectively, for up to a pre-set amount of time while waiting for the user to disconnect the first and second batteries. Upon disconnection of the first battery, the Charge Rate/Progress indicators 418A and 420A-D may illuminate in the "runway" pattern, indicating that the third battery charger 400 is in Dual Output mode and awaiting coupling of a battery to the charge output port 414A. Similarly, upon disconnection of the second battery, the Charge Rate/Progress indicators 418B and 420E-H may illuminate in the "runway" pattern, indicating that the third battery charger 400 is in Dual Output mode and awaiting coupling of a battery to the charge output port 414B.

Referring now to FIG. 29 a typical use of the third battery charger 400 in accordance with the method 1000 is shown. FIG. 29 demonstrates an embodiment of operation of the third battery charger 400 to charge a "smart" 7600 mAh LiPo battery. The battery is charged using charging parameters indicated by their respective RFID chips.

At Step 2901, the third battery charger 400 may be electrically connected to a power supply with no battery coupled to the charger. The charger may be configured for High Output operation. Upon reception of power, the third battery charger 400 may illuminate the indicators 418B and 420E-H in a runway pattern, indicating that the third battery charger 400 is receiving power and is awaiting coupling of a battery to the high power section connector port 414B.

The user may verify the fifth switch 428 is set for High Output mode operation at the Step 2902. The battery to be charged may be coupled to the third battery charger 400 at the step 2303 via the connector ports 114B. At the Step 2904, the sensor 309B may sense the RFID tag of the coupled battery. The "Start/Stop" button 402B may illuminate in response to the sensing of the RFID tag, indicating that the third battery charger 400 may receive information from the battery for configuring the high power section. The high power section may set the battery charger operating parameters to the "LiPo," "Balance," and "8A" settings at Step 2905. The user may then commence charging by pressing and holding the "Start/Stop" button 402B for 2 seconds at the Step 2906.

At Step 2907, the battery may charge at max current while the Charge Status indicator 418B blinks to indicate that the charging operation is ongoing. Additionally, the Charge Rate/Progress indicators 420E-H may illuminate to display the amount of charge contained by the battery relative to the peak charge of the battery.

At Step 2908, the Charge Status indicator 418B may cease blinking and illuminate solidly and the Charge Rate/Progress indicators 420E-H may turn off. Additionally, the audio enunciator 324 may generate a sound signaling completion of the charge operation performed by the high power section. The third battery charger 400 may "trickle charge" the battery for up to a pre-set amount of time while waiting for the user to disconnect the battery. Upon disconnection, the Charge Rate/Progress indicators 418B and 420E-H may illuminate in the "runway" pattern, indicating that the third battery charger 400 is in High Output mode and awaiting coupling of a battery to the charge output port 414B.

In the preceding discussion, numerous specific details are set forth to provide a thorough understanding of the present invention. However, the present invention may be practiced without such specific details. In other instances, well-known elements have been illustrated in schematic or block diagram form in order not to obscure the present invention in unnecessary detail. Additionally, and for the most part, details concerning well-known features and elements have been omitted inasmuch as such details are not considered necessary to obtain a complete understanding of the present invention. Specifically, details concerning electronic communications, electro-magnetic signaling techniques, RFID, battery charge current generation and control, methods of battery charging, and the like, have been omitted.

Having thus described the present invention by reference to certain of its exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable, based upon a review of the foregoing description of exemplary embodiments. Accordingly, it is appropriate that any claims supported by this description be construed broadly and in a manner consistent with the scope of the invention.

The invention claimed is:

1. A battery charger configured to simultaneously connect to a first battery and a second battery, comprising:
    a first power section generating a first charge rate according to either a first low current setting or a first high current setting for charging the first battery;

a second power section for generating a second charge rate for charging the second battery when the second power section is in an enabled state;

an output mode selector electrically coupled to each of the first and second power sections that is user actuated to select operation of the battery charger from at least a high output mode and a dual output mode;

wherein the first charge rate is generated according to the first high current setting and the second power section is disabled when the high output mode is selected by user actuation of the output mode selector; and wherein the first charge rate is generated according to the first low current setting and the second power section is enabled when the dual output mode is selected by user actuation of the output mode selector.

2. The battery charger according to claim 1 wherein the first low current setting comprises two or more charge rates.

3. The battery charger according to claim 1 wherein the first high current setting comprises two or more charge rates.

4. The battery charger according to claim 1 wherein the first low current charge rate and the second charge rate are independent in the dual output mode.

5. A battery charger configured to simultaneously connect to a first battery and a second battery, comprising:

an output mode selector operable to select between a high output mode and a dual output mode;

a first power section for generating a first charge rate for charging the first battery;

a second power section for generating a second charge rate for charging the second battery;

wherein the first charge rate is generated and the second charge rate is not generated when the high output mode is selected by a user; and wherein the first charge rate and the second charge rate are generated when the dual output mode is selected by the user.

6. The battery charger according to claim 5 wherein the first charge rate is selected from a first high current setting in the high output mode; and the first charge rate is selected from a first low current setting in the dual output mode.

7. The battery charger according to claim 6 wherein at least one of the first low current setting or the high current setting comprises two or more charge rates.

8. The battery charger according to claim 5 wherein the second power section is disabled in high output mode.

9. The battery charger according to claim 5 wherein in dual output mode:

the first charge rate and the second charge rate are independently determined; and the first charge rate is selected from a first low current setting.

10. A battery charger configured to simultaneously connect to a first battery and a second battery, comprising:

an output mode selector operable to select between a high output mode and a dual output mode;

a first power section for generating a first charge rate from either a first high output set of charging rates or a first dual output set of charging rates for charging the first battery;

a second power section for generating a second charge rate from a second dual output set of charging rates for charging the second battery;

wherein the first charge rate is generated from the first high output set of charging rates and the second charge rate is not generated when the high output mode is selected by a user; and wherein the first charge rate and the second charge rate are generated from the first dual output set of charging rates and the second dual output set of charging rates respectively when the dual output mode is selected by the user.

11. The battery charger according to claim 10, wherein at least one of the first power section or the second power section further comprises a charge rate input device.

12. The battery charger according to claim 11, wherein the charge rate input device is a user activated switch that cycles through the charging rates of the corresponding first power section or the second power section according to the selected dual output mode or high output mode.

13. The battery charger according to claim 10, wherein at least one of the first power section or the second power section further comprises a battery type input device.

14. The battery charger according to claim 13, wherein the battery type input device is a user activated switch selecting between at least a Lithium-polymer (LiPo) battery or a Nickel-metal hydride (NiMH) battery for the corresponding first power section or the second power section.

15. The battery charger according to claim 14, wherein selection of a battery type initially sets a default value for the charging rates of the corresponding first power section or the second power section according to the selected dual output mode or high output mode.

16. The battery charger according to claim 10, wherein at least one of the first power section or the second power section further comprises a charging mode input device.

17. The battery charger according to claim 16, wherein the charging mode input device is a user activated switch that cycles through two or more charge modes for the corresponding first power section or the second power section.

18. The battery charger according to claim 17, wherein the two or more charge modes are three charge modes and comprise a storage mode, a fast mode, and a balance mode.

19. The battery charger according to claim 10, wherein input charge parameters for at least one of the first power section or the second power section are set to default settings in response to a battery type received from a connected battery.

20. The battery charger according to claim 10, wherein input charge parameters for at least one of the first power section or the second power section are set to default settings in response to receipt of a balance port connector.

* * * * *